(12) United States Patent
Hagiwara

(10) Patent No.: US 9,307,139 B2
(45) Date of Patent: Apr. 5, 2016

(54) IMAGING APPARATUS AND IMAGING METHOD FOR SELECTING IMAGE FROM AMONG CAPTURED IMAGES

(71) Applicant: FUJITSU SEMICONDUCTOR LIMITED, Yokohama-shi, Kanagawa (JP)

(72) Inventor: Soichi Hagiwara, Komae (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/279,084

(22) Filed: May 15, 2014

(65) Prior Publication Data

US 2014/0375869 A1    Dec. 25, 2014

(30) Foreign Application Priority Data

Jun. 25, 2013    (JP) ................................. 2013-133194

(51) Int. Cl.
*H04N 5/232*    (2006.01)
*G02B 7/38*    (2006.01)

(52) U.S. Cl.
CPC .............. *H04N 5/23212* (2013.01); *G02B 7/38* (2013.01)

(58) Field of Classification Search
CPC ............ G02B 7/365; G02B 7/38; G02B 7/36; H04N 5/2356; H04N 5/23212
See application file for complete search history.

(56) References Cited

U.S. PATENT DOCUMENTS

| | | | | |
|---|---|---|---|---|
| 7,813,633 B2* | 10/2010 | Yoshida et al. | ............... | 396/103 |
| 8,014,661 B2* | 9/2011 | Yoshida et al. | ............... | 396/103 |
| 8,094,999 B2* | 1/2012 | Ohnishi | ......................... | 396/113 |
| 8,106,995 B2* | 1/2012 | Tamaru | ......................... | 348/345 |
| 8,576,327 B2* | 11/2013 | Hikida | ........................... | 348/345 |
| 8,823,861 B2* | 9/2014 | Yoshida | ......................... | 348/345 |
| 2006/0098106 A1* | 5/2006 | Tanaka | ..................... | 348/231.99 |
| 2009/0047010 A1* | 2/2009 | Yoshida et al. | ............... | 396/127 |
| 2009/0091633 A1* | 4/2009 | Tamaru | ..................... | 348/208.14 |
| 2009/0146045 A1* | 6/2009 | Yamaguchi | ................ | 250/201.4 |
| 2010/0215354 A1* | 8/2010 | Ohnishi | ......................... | 396/113 |
| 2010/0322611 A1* | 12/2010 | Yoshida et al. | ............... | 396/104 |
| 2011/0298961 A1* | 12/2011 | Yoshida | .................. | 348/333.01 |
| 2011/0298964 A1* | 12/2011 | Hikida | ........................... | 348/345 |

FOREIGN PATENT DOCUMENTS

| | | |
|---|---|---|
| JP | 2001-313865 A | 11/2001 |
| JP | 2006-140703 A | 6/2006 |
| JP | 2012-039570 A | 2/2012 |

* cited by examiner

*Primary Examiner* — Nicholas Giles
(74) *Attorney, Agent, or Firm* — Arent Fox LLP

(57) ABSTRACT

An imaging apparatus includes an imaging unit that photographs an object through a lens; a memory unit that stores images captured by the imaging unit; an adjusting unit that adjusts a position of the lens, based on a value that is obtained from each of the images captured by the imaging unit and that represents an extent of focusing by the lens; a calculating unit that calculates a local maximum value of the value, based on temporal changes of the value that is obtained from each of the images successively captured by the imaging unit and that represents the extent of focusing by the lens; and a selecting unit that selects an image from among the images stored in the memory unit, based on differences of the local maximum value and the value obtained from each of the images and representing the extent of focusing by the lens.

7 Claims, 16 Drawing Sheets

FOCUSING POSITION

FAR SIDE

NEAR SIDE $\sigma^2 = (\Delta t)^2 + (k\Delta\varphi)^2$

FOCUSING POSITION

FAR SIDE (10) → NEAR SIDE $\sigma^2 = (\Delta t)^2 + (k\Delta\varphi)^2$

FOCUSING RANGE CALCULATED FROM DEPTH OF FIELD

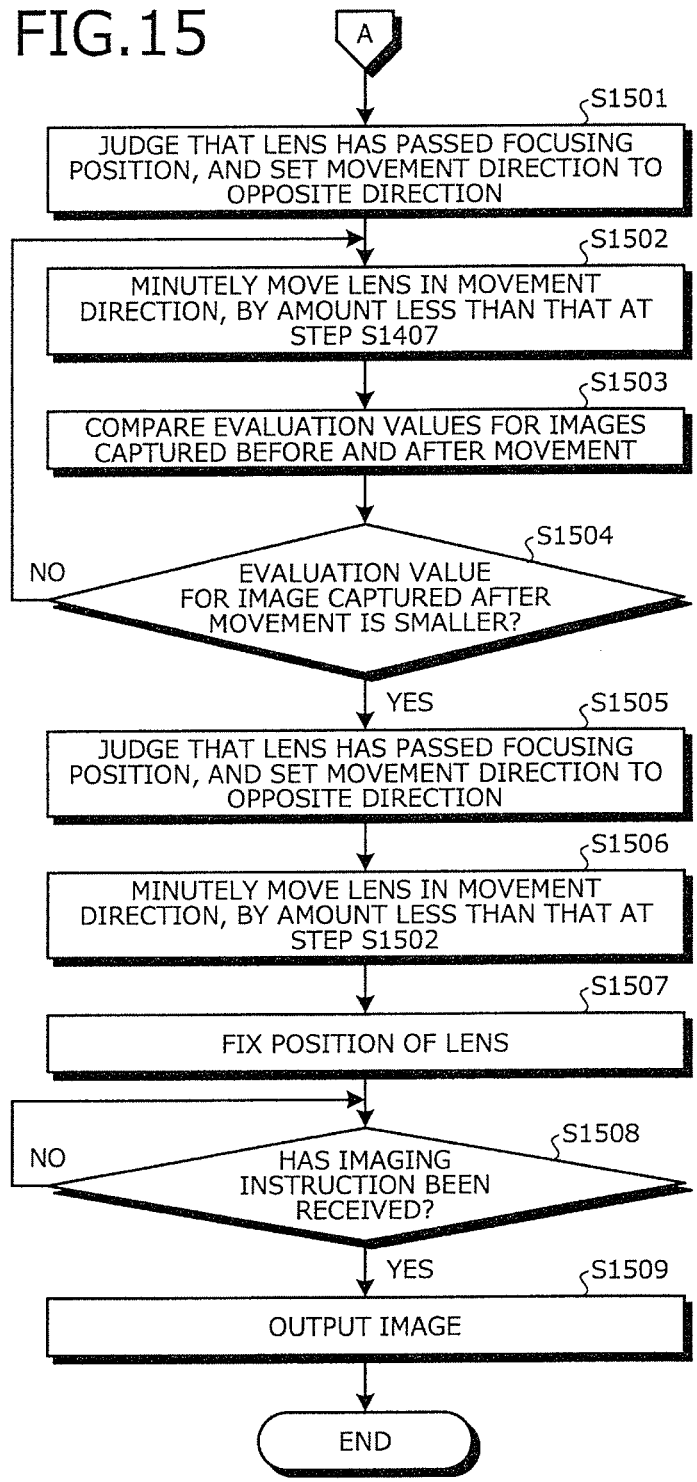

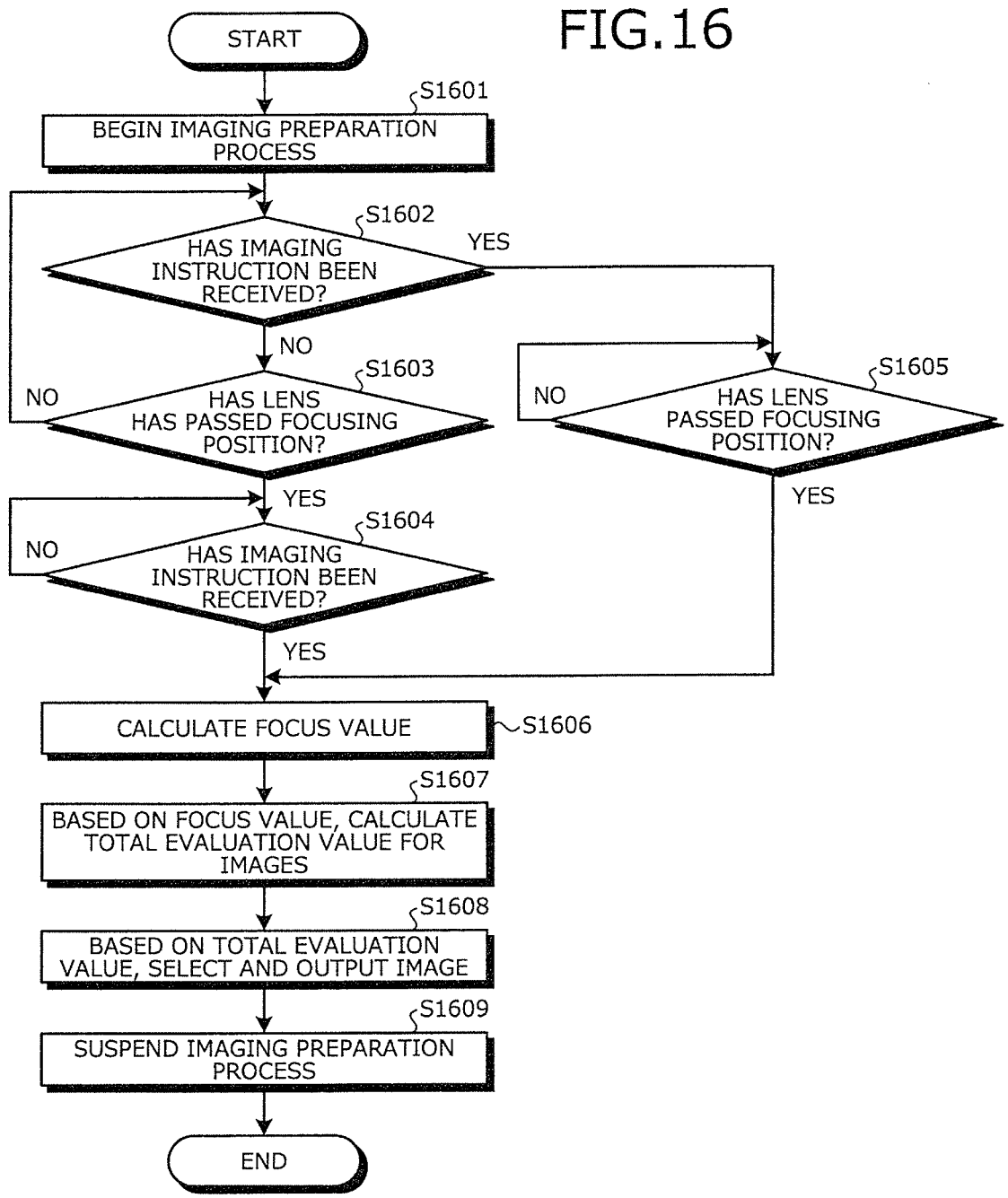

IMAGING APPARATUS AND IMAGING METHOD FOR SELECTING IMAGE FROM AMONG CAPTURED IMAGES

CROSS REFERENCE TO RELATED APPLICATIONS

This application is based upon and claims the benefit of priority of the prior Japanese Patent Application No. 2013-133194, filed on Jun. 25, 2013, the entire contents of which are incorporated herein by reference.

FIELD

The embodiment discussed herein is related to an imaging apparatus and an imaging method.

BACKGROUND

A conventional digital camera has an autofocus (AF) function of automatically adjusting the position of a lens such that light rays from an object pass through the lens and converge on an image sensor. The digital camera adjusts the position of the lens, based on contrast changes obtained from continuously captured images.

According to a related technique, for example, concerning post-capture image data, when a release button is pressed once, an evaluation value for sorting images is calculated and corrections are made such that the evaluation value for image data before autofocusing has been completed decreases. According to another technique, for example, imaging preparation operations are started for taking in multiple images continuously; a finder image that is based on the images is displayed on a liquid crystal panel; and an image corresponding to the finder image displayed on the liquid crystal panel when an imaging instruction is received, is recorded to a memory card. According to another technique, the time lag between shutter switch operation and display on a display is detected, and when the shutter switch is completely pressed down, from among frame images stored to temporary storage memory, the frame image of an earlier point in time corresponding to the time lag is selected and recorded. For examples of such conventional techniques, refer to Japanese Laid-Open Patent Publication Nos. 2012-39570, 2001-313865, and 2006-140703.

Nonetheless, with the conventional techniques above, the output of a focused image before completion of the autofocus is difficult.

SUMMARY

According to an aspect of an embodiment, an imaging apparatus includes an imaging unit configured to photograph an object through a lens; a memory unit configured to store images captured by the imaging unit; an adjusting unit configured to adjust a position of the lens, based on a value that is obtained from each of the images captured by the imaging unit and that represents an extent of focusing by the lens; a calculating unit configured to calculate a local maximum value of the value that represents the extent of focusing by the lens, based on temporal changes of the value that is obtained from each of the images successively captured by the imaging unit and that represents the extent of focusing by the lens; and a selecting unit configured to select an image from among the images stored in the memory unit, based on differences of the local maximum value calculated by the calculating unit and the value obtained from each of the images and representing the extent of focusing by the lens.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 14 and 15 are flowcharts of an example of a procedure of an imaging preparation process performed by the imaging apparatus 100; and FIG. 16 is a flowchart of an example of a procedure of an image selection process performed by the imaging apparatus 100.

DESCRIPTION OF EMBODIMENTS

An embodiment of an imaging apparatus and an imaging method will be described with reference to the accompanying drawings.

Figure 1A:
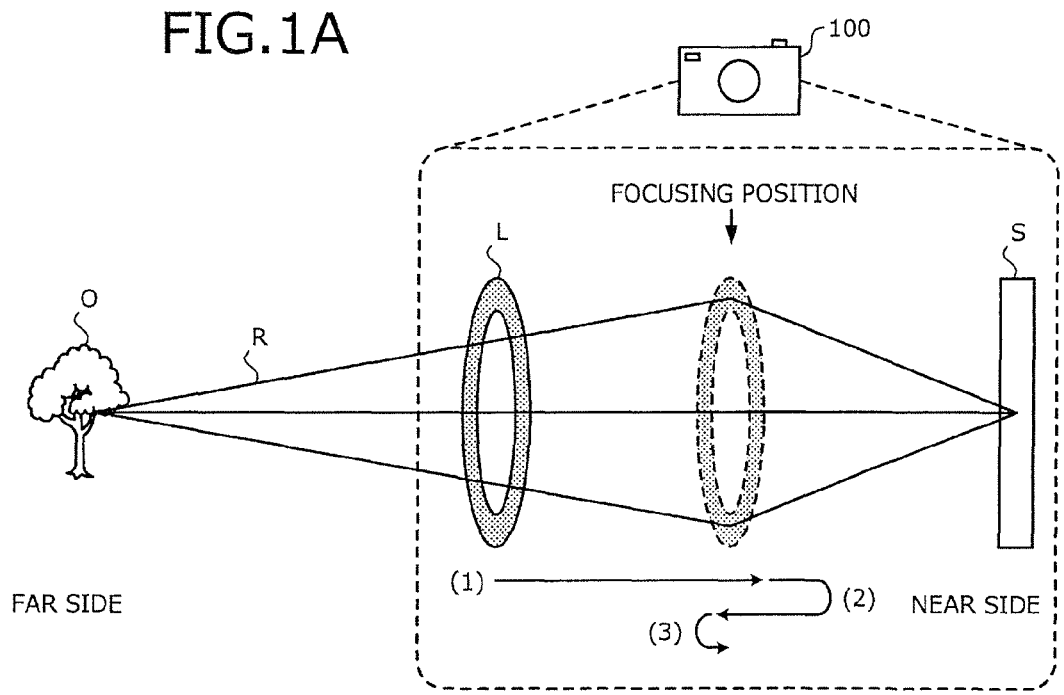
FIGS. 1A and 1B are diagrams of imaging operations of an imaging apparatus 100 according to an embodiment.
Figure 1B:
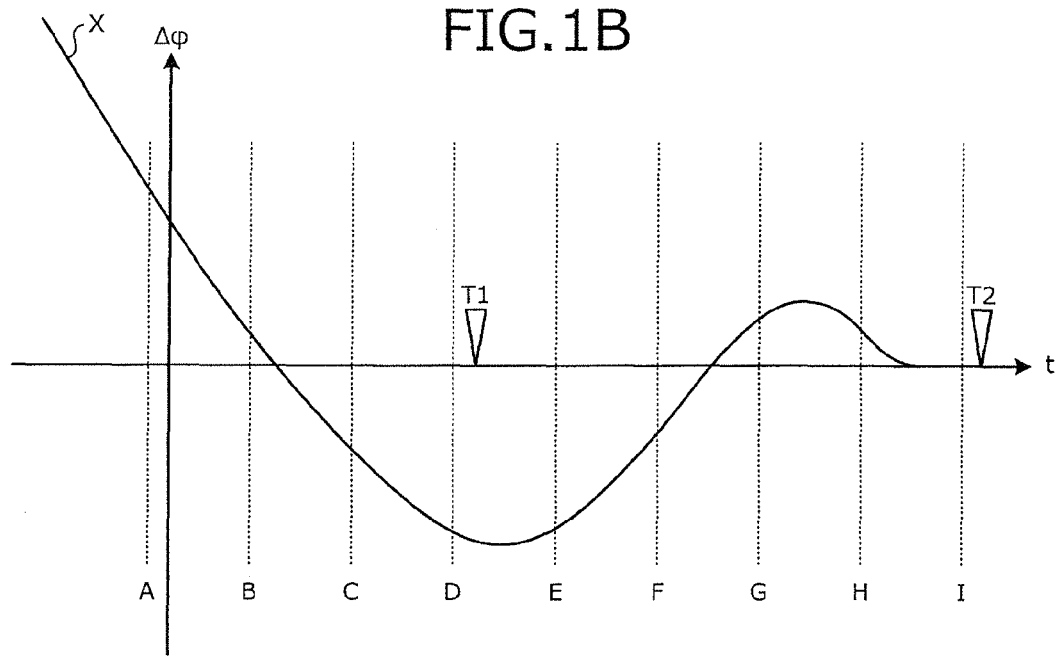

FIGS. 1A and 1B are diagrams of imaging operations of an imaging apparatus 100 according to the embodiment.

The imaging apparatus 100 is an apparatus that performs autofocus. In the description hereinafter, "autofocus" may be indicated as "AF". The imaging apparatus 100, for example, starts AF when the shutter button is pressed. Further, the imaging apparatus 100, for example, may start AF at the time of being powered on.

The imaging apparatus 100 is an apparatus that causes light rays R from an object O to be incident on an image sensor S, through a lens L, and by the image sensor S, continuously captures images of the object O. In the description hereinafter, although the lens L will be described as 1 lens for the sake of simplicity, the lens L is not limited hereto. For example, the lens L may be a combination of plural lenses.

As described above, here, AF is adjustment of the position of the lens L such that the lens L is within a "focal range". The focal range is a range where the lens L is at a position that causes the light rays R from the object O to pass through the lens L and converge at the image sensor S, under the ideal conditions that the object O is a point light source and aberration does not occur.

Under real conditions, the object O is present in plural within an imaging range, the distance between each object O and the lens L differs and aberration occurs. Therefore, in reality, the focal range is regarded as a range where the lens L is at a position that is within a given allowable range from the position that causes the light rays R from the object O to pass through the lens L and converge at the image sensor S. In the description hereinafter, "focused" indicates "a state where the lens L is at a position that is within a given allowable range from the position that causes the light rays R from the object O to pass through the lens L and converge at the image sensor S".

In addition to AF, the imaging apparatus 100 may further perform automatic exposure (AE). Nonetheless, in the description hereinafter, description of AE will be omitted for the sake of simplicity.

FIG. 1A depicts movement of the lens L in a case of AF. The imaging apparatus 10 calculates from images continuously captured by the image sensor S, an evaluation value that represents the extent of focusing by the lens L, while moving the lens L toward a near side, or a far side. An evaluation value is, for example, a value that indicates image contrast.

Next, based on changes of the evaluation value, the imaging apparatus 100 judges whether the lens L is approaching the position establishing the focal range. If the lens L is approaching the position, the imaging apparatus 100 continues to move the lens L in the same direction and if not, the imaging apparatus 100 moves the lens L in the opposite direction. In the description hereinafter, the position establishing the focal range may be indicated as "focusing position".

Thus, the imaging apparatus 100 moves the position of the lens L to the focusing position by repeatedly "moving the lens L toward the focusing position; and when the lens passes the focusing position, by again moving the lens L toward the focusing position".

In the example depicted in FIG. 1A, (1) the imaging apparatus 100 moves the lens L toward the near side and judges whether the evaluation value, which represents the extent of focusing by the lens L and is obtained from each image captured by the image sensor S, increases. In this example, the evaluation value has increased consequent to moving the lens L toward the near side and therefore, the imaging apparatus 100 judges that the lens L is approaching the focusing position and continues to move the lens L toward the near side.

(2) When the imaging apparatus 100 continues to move the lens L toward the near side, the evaluation value begins to decrease, not increase and therefore, the imaging apparatus 100 judges that the lens L has passed the focusing position and moves the lens L in the opposite direction, toward the far side, at a speed slower than that in the case of (1). The imaging apparatus 100 again moves the lens L toward the focusing position.

Here, preliminarily identifying the focusing position is difficult and the imaging apparatus 100 determines that the lens L has passed the focusing position after the lens L has passed the focusing position. Therefore, stopping the lens L at the focusing position is difficult. Further, if the imaging apparatus 100 immediately stops the lens L at the point in time when the imaging apparatus 100 judges that the lens L has passed the focusing position, driving components of the lens L will wear out. Therefore, stopping the lens L at the point in time when the lens L is judged to have passed the focusing position is difficult.

(3) While the imaging apparatus 100 continues to move the lens L toward the far side, the evaluation value begins to decrease, not increase and therefore, the imaging apparatus 100 judges that the lens L has passed the focusing position and moves the lens L in the opposite direction, toward the near side, at a speed slower than that in the case of (2). The imaging apparatus 100 again moves the lens L toward the focusing position. Thus, the imaging apparatus 100 stops the lens L near the focusing position.

FIG. 1B depicts imaging operations during AF. In the graph depicted in FIG. 1B, the vertical axis represents a difference $\Delta\phi$ of the local maximum value of the evaluation value representing the extent of focusing by the lens L and the evaluation value representing the extent of focusing by the lens L. The closer a value is to 0 along the vertical axis, the closer the lens L is to the focusing position. The horizontal axis represents time t. The units of time t are, for example, milliseconds. The dotted lines are imaging time points when an image is capture by the image sensor S. In the description hereinafter, images respectively captured at the time points A to I indicated by the dotted lines may be indicated as "images A to I". A solid line X indicates temporal changes of the difference $\Delta\phi$. The closer the solid line X is to 0 along the vertical axis, the greater the evaluation value is.

At (2) depicted in FIG. 1A, upon judging that the lens L has passed the focusing position, the imaging apparatus 100 calculates the local maximum value of the evaluation value. In the description hereinafter, the local maximum value of the evaluation value may be indicated as "focus value". The imaging apparatus 100, for example, calculates an evaluation value from image B, which is captured by the image sensor S immediately before the lens L passes the focusing position, calculates an evaluation value from image C, which is captured by the image sensor S immediately after the lens L has passed the focusing position, and calculates the average of the evaluation values as the focus value.

The imaging apparatus 100 calculates differences of the focus value and respective evaluation values obtained from each captured image; and based on the differences, selects an image, and outputs the selected image. As a result, the imaging apparatus 100 can select and output an image captured with the lens L in the focal range, even before AF has been completed.

Further, for example, if the shutter button is completely pressed down at time point T1, the imaging apparatus 100 is not required to wait until time point T2 when the AF has been completed, to select and output image I captured with the lens L in the focal range at time point T2. For example, the imaging apparatus 100 can select and output image C captured with the lens L in the focal range at a time point near time point T1 when the shutter button is completely pressed down. As a result, the imaging apparatus 100 can select and output image C, which is a focused image captured at a time point closer to the time point at which the user wanted to capture an image than the time point of image I.

Further, for example, if the shutter button is completely pressed down at time point T1, the imaging apparatus 100 need not select and output image D, which is captured at the time point closest to time point T1, but not with the lens L in the focal range. For example, the imaging apparatus 100 can select and output image C, which is captured with the lens L in the focal range at a time point close to time point T1 when the shutter button is pressed down. As a result, the imaging apparatus 100 can select and output image C, which is captured with the lens L in a better focal range than image D, at a time point close to the time point at which the user wanted to capture an image.

Figure 2:
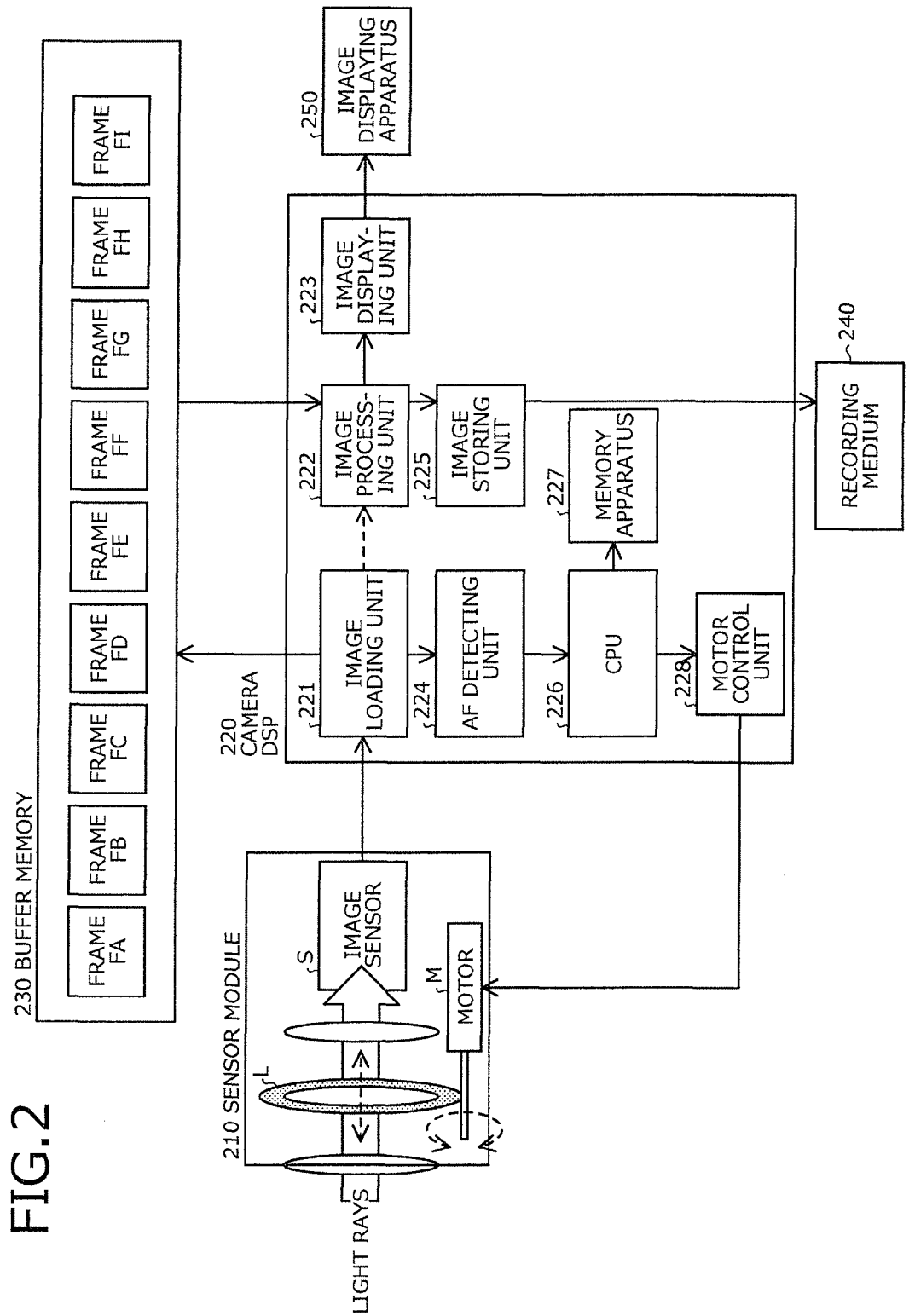
FIG. 2 is a block diagram of an example of a hardware configuration of the imaging apparatus 100.

FIG. 2 is a block diagram of an example of a hardware configuration of the imaging apparatus 100.

In FIG. 2, the imaging apparatus 100 has a sensor module 210, a camera digital signal processor (DSP) 220, buffer memory 230, a recording medium 240, and a display 250.

The sensor module 210 is an apparatus that converts the light rays R from the object O into electronic signals by an opto-electronic element and transmits the electronic signals to the camera DSP 220. The sensor module 210 has a movable lens L, a motor M, and the image sensor S.

The movable lens L is an element for refracting and converging at the image sensor S, the light rays R from the object O. The movable lens L includes 5 to 15 lenses L. The motor M is a drive apparatus for moving the position of the movable lens L. The image sensor S is an element that converts the light rays R that are incident through the lens L into electrical energy by the photoelectric effect and transmits the electrical energy as sensor data to the camera DSP 220.

The camera DSP 220 has an image loading unit 221, an image processing unit 222, an image displaying unit 223, an AF detecting unit 224, an image storing unit 225, a central processing unit (CPU) 226, a memory apparatus 227, and a motor control unit 228.

The image loading unit 221 takes in the sensor data and outputs the sensor data to the AF detecting unit 224 and the buffer memory 230. The image loading unit 221 may take in the sensor data and output the sensor data to the image processing unit 222. The image processing unit 222 converts the sensor data into image data and outputs the image data to the image storing unit 225 and the image displaying unit 223. The image displaying unit 223 is an apparatus that displays images on the display (image displaying apparatus) 250, based on image data.

The AF detecting unit 224 is an apparatus that uses a high-pass filter to extract a high frequency component from the sensor data obtained by the image sensor S and calculates the extracted component amount as the evaluation value. The image storing unit 225 is an apparatus that receives the image data from the image processing unit 222 and stores the image data to the recording medium 240.

The CPU 226 governs overall control of the camera DSP 220. The memory apparatus 227 stores therein programs such as a boot program. The memory apparatus 227 is used as a work area of the CPU 226. Read only memory (ROM) and random access memory (RAM), for example, can be employed as the memory apparatus 227. The motor control unit 228 controls the rotational direction and speed of the motor M.

The buffer memory 230 is the memory apparatus 227 that temporarily stores therein the sensor data obtained by the image sensor S. The buffer memory 230, for example, may implement a ring buffer by Synchronous Dynamic Random Access Memory (SDRAM). The buffer memory 230 has, for example, 9 frames FA to FI and stores sensor data to an empty frame. If no frame is empty, the buffer memory 230 overwrites the sensor data to the frame storing the oldest sensor data. A method of storing the sensor data to the buffer memory 230 will be described with reference to FIGS. 3 and 4.

The recording medium 240 is an apparatus that records the image data. Flash memory can be employed as the recording medium. The display 250 is an apparatus that displays images. In addition to a cursor, icons, and toolboxes, the display 250 displays data such as text, images, and functional information. A liquid crystal display, a plasma display, etc. may be employed as the display 250.

Figure 3:
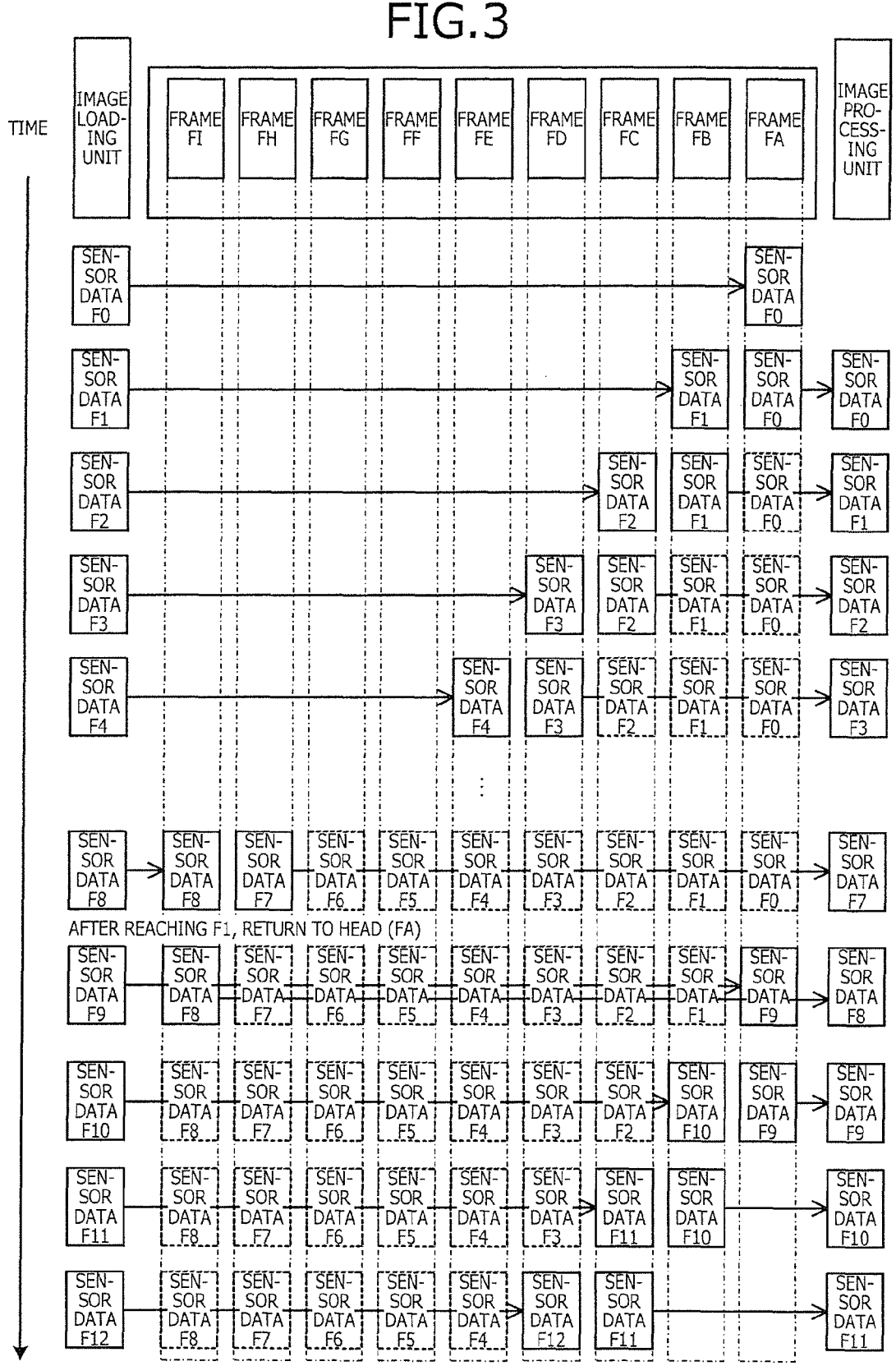
FIGS. 3 and 4 are diagrams depicting an example of a method of storing sensor data to a buffer memory 230.
Figure 4:
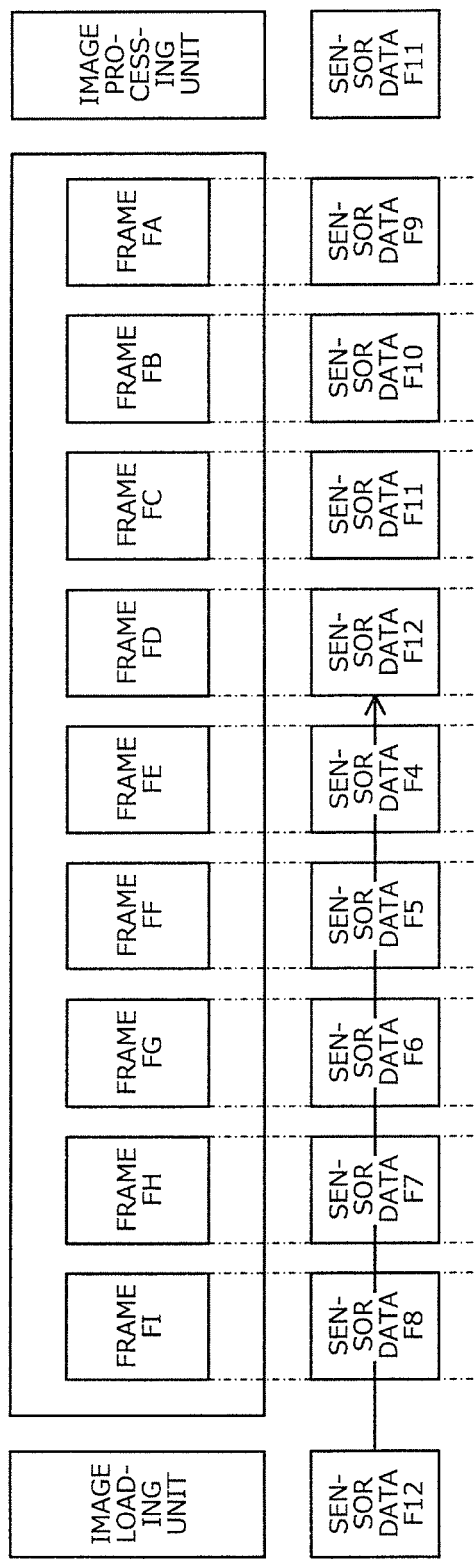

With reference to FIGS. 3 and 4, an example of a method of storing sensor data to the buffer memory 230 will be described.

FIGS. 3 and 4 are diagrams depicting an example of a method of storing sensor data to the buffer memory 230. Each time sensor data is taken in by the image loading unit 221, the imaging apparatus 100 stores the sensor data to an empty frame and if no frame is empty, the imaging apparatus 100 overwrites the frame that stores the oldest sensor data.

As depicted in FIG. 3, when the sensor data F0 is taken in by the image loading unit 221, the imaging apparatus 100 stores the sensor data F0 to an empty frame FA. When the sensor data F1 is taken in by the image loading unit 221, the imaging apparatus 100 stores the sensor data F1 to an empty frame FB. In the same manner, the imaging apparatus 100 respectively stores the sensor data F2 to F8 to empty frames FC to FI.

When the sensor data F9 is taken in by the image loading unit 221, the imaging apparatus 100 overwrites the sensor data F9 to the frame FA, which stores the oldest sensor data F0. In the same manner, the imaging apparatus 100 respectively overwrites the sensor data F10 to F12 to the frames FB to FD.

Thus, among the sensor data taken in by the image loading unit 221, the imaging apparatus 100 can store the past 8 sensor data in addition to the newest sensor data.

As depicted in FIG. 4, for example, at the time point when the operation depicted in FIG. 3 ends, the imaging apparatus 100 can select and extract from the buffer memory 230, any one of the sensor data F4 to F12. The imaging apparatus 100 converts the extracted sensor data into image data and based on the image data, an image can be displayed in the display 250.

Figure 5:
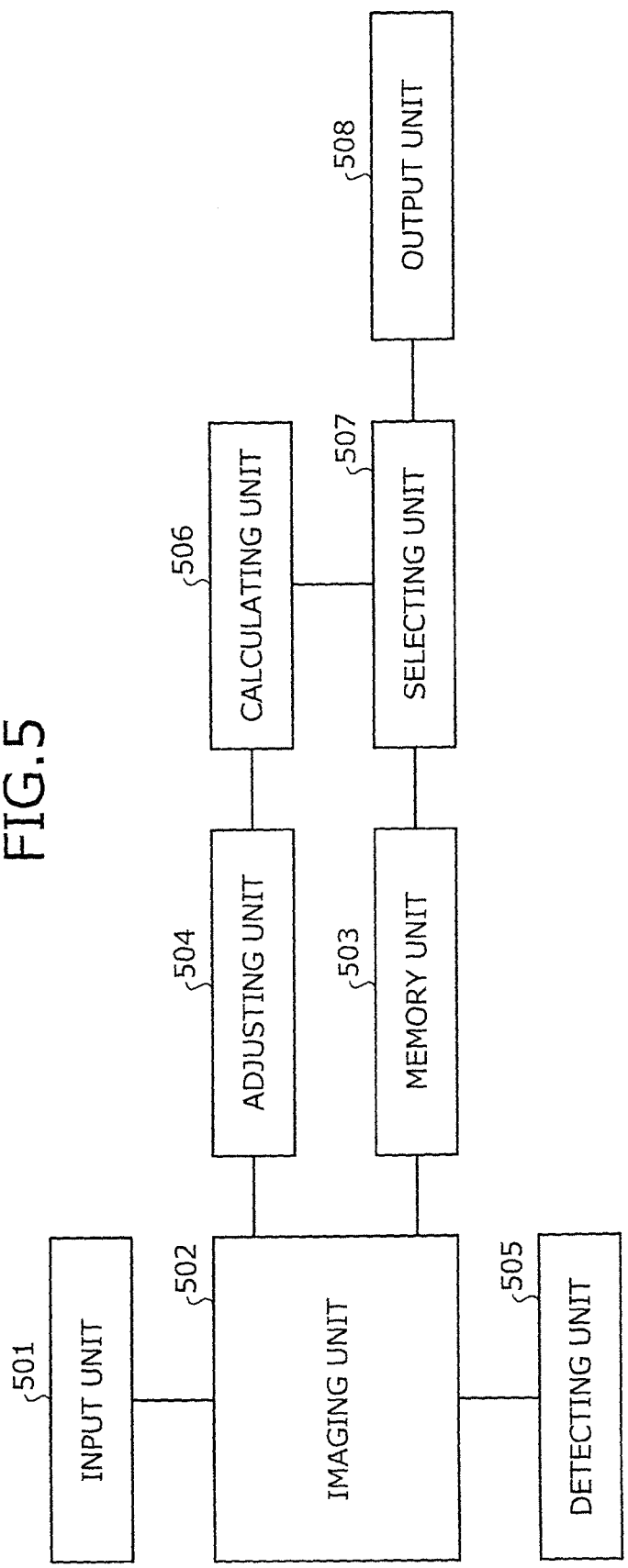
FIG. 5 is a block diagram of an example of a functional configuration of the imaging apparatus 100.

With reference to FIG. 5, an example of a functional configuration of the imaging apparatus 100 will be described.

FIG. 5 is a block diagram of an example of a functional configuration of the imaging apparatus 100. The imaging apparatus 100 includes an input unit 501, an imaging unit 502, a memory unit 503, an adjusting unit 504, a detecting unit 505, a calculating unit 506, a selecting unit 507, and an output unit 508. The imaging apparatus 100 can perform an operation of selecting an image from among images stored in the buffer memory 230 and outputting the selected image. In the description hereinafter, the operation of selecting an image and outputting the selected image may be indicated as a "first operation".

Further, the imaging apparatus 100 can perform an operation of suspending the AF before the AF has been completed. In the description hereinafter, the operation of suspending the AF before the AF has been completed may be indicated as a "second operation".

The first operation will be described. For example, the first operation is implemented by the input unit 501, the imaging unit 502, the memory unit 503, the adjusting unit 504, the detecting unit 505, the calculating unit 506, the selecting unit 507, and the output unit 508.

The input unit 501 receives an input of an imaging instruction. Here, an imaging instruction is an instruction generated when the user completely presses down the shutter button to cause the imaging apparatus 100 to capture an image of the object O. For example, an imaging instruction is an instruction causing the imaging apparatus 100 to select an image from among the images stored in the buffer memory 230. The input unit 501, for example, receives an imaging instruction generated consequent to operation input by the user. The input unit 501 detects that the user has completely pressed down the shutter button and receives the action as an imaging instruction.

The input unit 501 may receive an input of an imaging preparation instruction prior to an imaging instruction. Here, an imaging preparation instruction is an instruction generated when the user presses the shutter button halfway to cause imaging apparatus 100 to perform AF. An imaging preparation instruction, for example, is an instruction to cause the imaging unit 502 start photographing the object O and to cause the adjusting unit 504 to start adjusting the position of the lens L. The input unit 501, for example, prior to an imaging instruction, receives an imaging preparation instruction generated consequent to operation input by the user. The input unit 501 detects that the user has pressed the shutter button halfway and receives the action as an imaging preparation instruction.

Data that is input is stored to a memory area of, for example, the memory apparatus 227. The input unit 501, for example, is implemented by executing on the CPU 226, a program stored in the memory apparatus 227 depicted in FIG. 2. Thus, the input unit 501 can receive a trigger to start an imaging process or an imaging preparation process.

The imaging unit 502 photographs the object O through the lens L. The imaging unit 502, for example, receives the light rays R from the object O, through the lens L, and optoelectronically converts the received light rays R to obtain sensor data. The imaging unit 502 may start photographing the object O, if, for example, an input of an imaging preparation instruction is received by the input unit 501.

Resulting data, for example, is stored to a memory area of the buffer memory 230. The imaging unit 502, for example, is implemented by the sensor module 210, by the image loading unit 221, and by executing on the CPU 226, a program stored in the memory apparatus 227 depicted in FIG. 2. Thus, the imaging unit 502 can photograph the object O and store the image to the memory unit 503.

The memory unit 503 stores images captured by the imaging unit 502. The memory unit 503, for example, is implemented by the buffer memory 230. As a result, the memory unit 503 can store the images captured by the imaging unit 502.

The adjusting unit 504 adjusts the position of the lens L, based on a value that is obtained from an image captured by the imaging unit 502 and represents the extent of focusing by the lens L. The value representing the extent of focusing by the lens L is the evaluation value described above, and a value that indicates the contrast of the image. The value representing the extent of focusing by the lens L, for example, is the amount of high frequency components extracted from the image using a high-pass filter. The adjusting unit 504, for example, adjusts the position of the lens L, based on temporal changes of the values that represent the extent of focusing by the lens L and that are obtained from successive images captured by the imaging unit 502.

The adjusting unit 504, for example, performs contrast AF and moves the lens L. Here, contrast AF is a method of moving the lens L, based on the contrast of an image. The adjusting unit 504, for example, is implemented by the sensor module 210, by the motor control unit 228, and by executing on the CPU 226, a program stored in the memory apparatus 227 depicted in FIG. 2.

The detecting unit 505 detects that the value representing the extent of focusing by the lens L has become locally maximized. A case where the value becomes locally maximized is when the detecting unit 505 detects that the state of the evaluation value switches from an increasing state to a decreasing state, accompanying the adjustment of the lens L by the adjusting unit 504. In other words, the detecting unit 505 detects that the lens L has passed the focusing position.

Detection results, for example, are stored to a memory area of the memory apparatus 227. The detecting unit 505, for example, is implemented by executing on the CPU 226, a program stored in the memory apparatus 227 depicted in FIG. 2. Thus, the detecting unit 505 can detect that the lens L has passed the focusing position.

The calculating unit 506, based on temporal changes of the values that are obtained from images successively captured by the imaging unit 502 and represent the extent of focusing by the lens L the imaging unit 502, calculates the local maximum value of the values that represent the extent of focusing by the lens L. Here, the local maximum value is the focus value described above. As the focus value, the calculating unit 506, for example, may calculate the average of the evaluation values immediately before and immediately after the lens L is detected to have passed the focusing position. Further, the calculating unit 506 may calculate, as the focus value, the average of the evaluation values immediately before and immediately after the lens L has been detected to have passed the focusing position, if, for example, the detecting unit 505 detects that lens L has passed the focusing position.

The calculating unit 506 may calculate the difference of the local maximum value calculated by the calculating unit 506 and the value obtained from an image and representing the extent of focusing by the lens L. The calculating unit 506, for example, calculates the difference $\Delta\phi$ of an evaluation value for an image and the focus value. Further, the calculating unit 506 may calculate the difference of the local maximum value calculated by the calculating unit 506 and the value obtained from an image and representing the extent of focusing by the lens L, as well as the difference of the time point when the image was captured and the time point when the input of an imaging instruction was received by the input unit 501. The calculating unit 506, for example, may calculate the difference $\Delta\phi$ of the evaluation value of an image and the focus value, as well as the difference $\Delta t$ of the time point when the image was captured and the time point when the input of the imaging instruction was received by the input unit 501. Further, the calculating unit 506 may substitute $\Delta\phi$ and $\Delta t$ in a total evaluation value $\sigma$ equation $\sigma^2 = \Delta\phi^2 + k\Delta t^2$ for an image, to calculate a total evaluation value $\sigma$.

The calculating unit 506, for example, in place of $\Delta\phi$, may calculate an intermediate value $\Delta t'$ of an imaging time point immediately before and an imaging time point immediately after the lens L is detected to have passed the focusing position. The calculating unit 506, for example, may substitute $\Delta t'$ and $\Delta t$ in a total evaluation value $\sigma$ equation $\sigma^2 = \Delta t'^2 + k\Delta t^2$ for an image, to calculate the total evaluation value $\sigma$.

Calculation results, for example, are stored to a memory area of the memory apparatus 227. The calculating unit 506 is implemented, for example, by executing on the CPU 226, a program stored in the memory apparatus 227 depicted in FIG. 2. Consequently, the selecting unit 507 can use the focus value calculated by the calculating unit 506 to select an image stored in the memory unit 503.

Based on the difference of the local maximum value calculated by the calculating unit 506 and the values obtained from images and representing the extent of focusing by the lens L, the selecting unit 507 selects an image from among the images stored in the memory unit 503. The selecting unit 507, for example, selects the image for which the difference $\Delta\phi$ calculated by the calculating unit 506 is the smallest. The selecting unit 507, for example, may select plural images for which the difference $\Delta\phi$ is less than or equal to a threshold.

The selecting unit 507 may select an image based on an imaging instruction input by the input unit 501 and the difference of the local maximum value calculated by the calculating unit 506 and the values obtained from images and representing the extent of focusing by the lens L. The selecting unit 507, for example, may select an image based on the difference of the local maximum value image calculated by the calculating unit 506 and the values obtained from images and representing the extent of focusing by the lens L, and the difference of the time point when an image was captured and the time point when an imaging instruction was input by the input unit 501. The selecting unit 507, for example, selects the image for which the total evaluation value $\sigma^2 = k\Delta t^2 + k\Delta t^2$ calculated by the calculating unit 506 is the smallest.

Further, the selecting unit 507, for example, may select the image for which the total evaluation value $\sigma^2 = \Delta t^2 + k\Delta t^2$ calculated by the calculating unit 506 is the smallest. The selecting unit 507, for example, may select plural images for which the calculating unit 506 calculates a total evaluation value $\sigma$ that is less than or equal to a threshold.

The selecting unit 507 may select, as described above, an image from among the images stored in the memory unit 503, when the value representing the focus of the lens L is first detected to become locally maximized after the receipt of an input of an imaging instruction. Further, the selecting unit 507 may select, as described above, an image from among the images stored in the memory unit 503, when the input of an imaging instruction is received after the value that represents the extent of focusing by the lens L has been detected to become locally maximized.

Selection results, for example, are stored to a memory area of the memory apparatus 227. The selecting unit 507 is implemented, for example, by executing on the CPU 226, a program stored in the memory apparatus 227 depicted in FIG. 2. Thus, the selecting unit 507 can select an image to be output by the output unit 508.

The output unit 508 outputs the image selected by the selecting unit 507. Forms of output may be, for example, display on the display 250 and recording to a memory area such as that of the recording medium 240. The output unit 508, for example, is implemented by the image displaying unit 223, by the image storing unit 225, or by executing on the CPU 226, a program stored in the memory apparatus 227 depicted in FIG. 2. Thus, the output unit 508 can notify the user of an image.

The second operation will be described. The second operation, for example, is implemented by the imaging unit 502 and the adjusting unit 504.

The imaging unit 502 suspends the photographing of the object O, when an image has been selected by the selecting unit 507. As a result, if an image has been selected although AF has not been completed, the imaging unit 502 suspends the photographing of the object O to enable a reduction of the power consumed for photographing the object O.

The imaging unit 502 may suspend the photographing of the object O, when the value representing the extent of focusing by the lens L is first detected to become locally maximized after the input of an imaging instruction has been received. As a result, if an image subject to selection by the selecting unit 507 is present although AF has not been completed, the imaging unit 502 suspends the photographing of the object O to enable a reduction of the power consumed for photographing the object O.

The imaging unit 502 may suspend the photographing of the object O, when the input of an imaging instruction is received after the value representing the extent of focus by the lens L has been detected to become locally maximized. As a result, if an image subject to selection by the selecting unit 507 is present although AF has not been completed, the imaging unit 502 suspends the photographing of the object O to enable a reduction of the power consumed for photographing the object O.

The adjusting unit 504 suspends the positioning adjustment of the lens L, when the imaging unit 502 suspends the photographing of the object O. As a result, the adjusting unit 504 can reduce the power consumed for adjusting the position of the lens L and suppress the wear of the motor M used for adjusting the lens L.

A first example of an imaging process by the imaging apparatus 100 will be described with reference to FIGS. 6A to 8B.

Figure 6A:
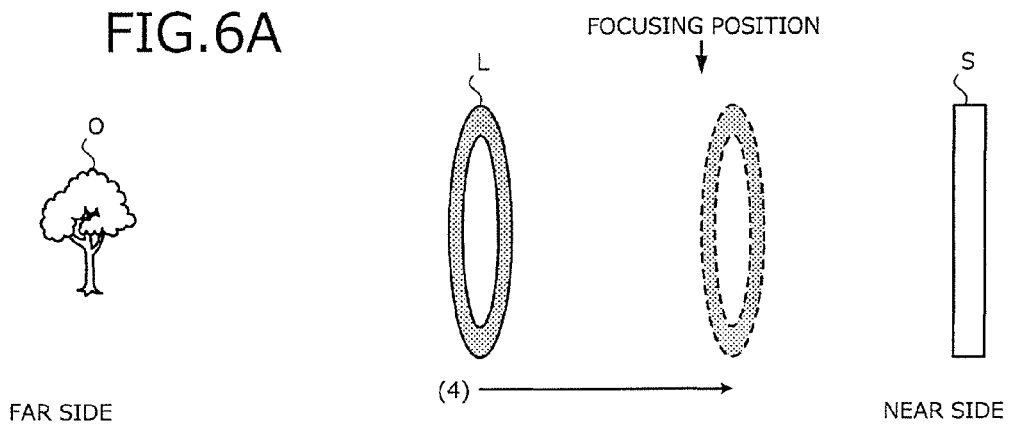
FIGS. 6A, 6B, 7A, 7B, 8A and 8B are diagrams of a first example of an imaging process performed by the imaging apparatus 100.
Figure 6B:
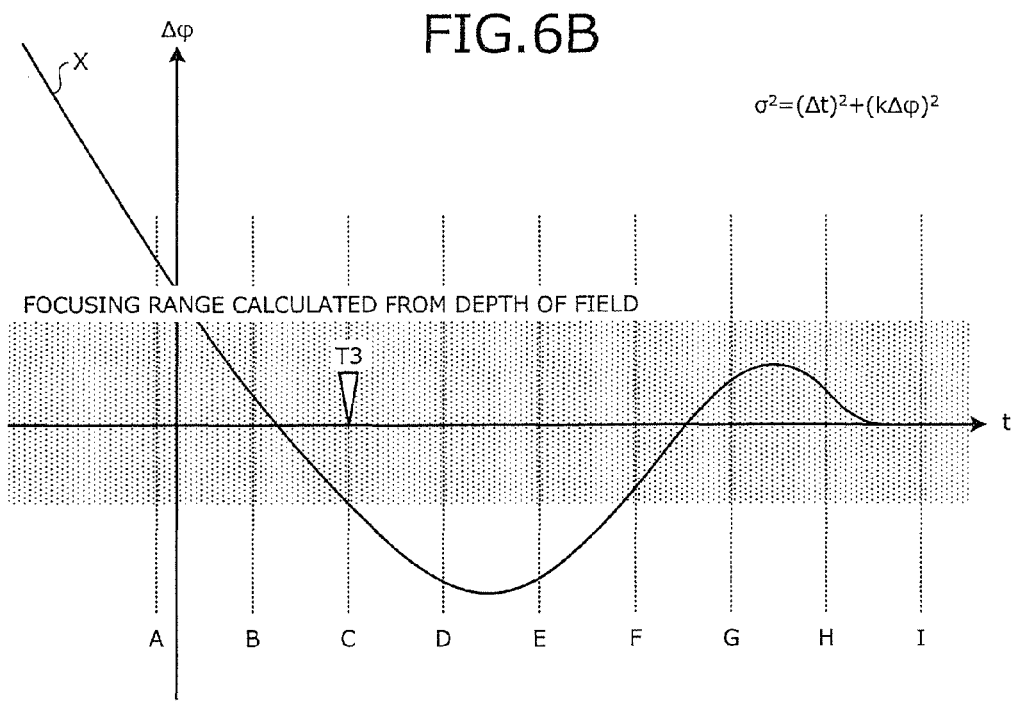

FIGS. 6A, 6B, 7A, 7B, 8A and 8B are diagrams of the first example of the imaging process performed by the imaging apparatus 100. FIGS. 6A and 6B depict an example concerning time point T3 at which the lens L first passes the focusing position during AF when the imaging apparatus 100 moves the lens L. In the example depicted in FIG. 6A, (4) the imaging apparatus 100 moves the lens L toward the near side whereby the evaluation value increases and therefore, the imaging apparatus 100 judges that the lens L is approaching the focusing position and continues to move the lens L toward the near side.

While the imaging apparatus 100 continues to move the lens L toward the near side, at time point T3, the evaluation value begins to decrease, not increase and therefore, the imaging apparatus 100 judges that the lens L has passed the focusing position. Here, the imaging apparatus 100 has not yet received an imaging instruction and therefore, continues AF.

FIG. 6B depicts imaging operations during AF. In the graph depicted in FIG. 6B, the closer the solid line X is to 0 along the vertical axis, the greater the evaluation value is. A focusing range calculated from the depth of field is an allowable range of the difference $\Delta\phi$ for judging that the lens L in the focal range. Here, the depth of field is a value indicating an allowable range of the position of the object O for which the lens L is in the focal range. In the graph depicted in FIG. 6B, the vertical axis, the horizontal axis, and the dotted lines are the same as those in the graph depicted in FIG. 1B and therefore, description thereof is omitted.

At time point T3, upon judging that the lens L has passed the focusing position, the imaging apparatus 100 calculates the focus value. The imaging apparatus 100, for example, calculates an evaluation value from image B captured by the image sensor S immediately before the lens L passes the focusing position, calculates an evaluation value from image C captured by the image sensor S immediately after the lens L has passed the focusing position, and calculates the average of the evaluation values as the focus value. Next, description will be given with reference to FIGS. 7A and 7B.

Figure 7A:
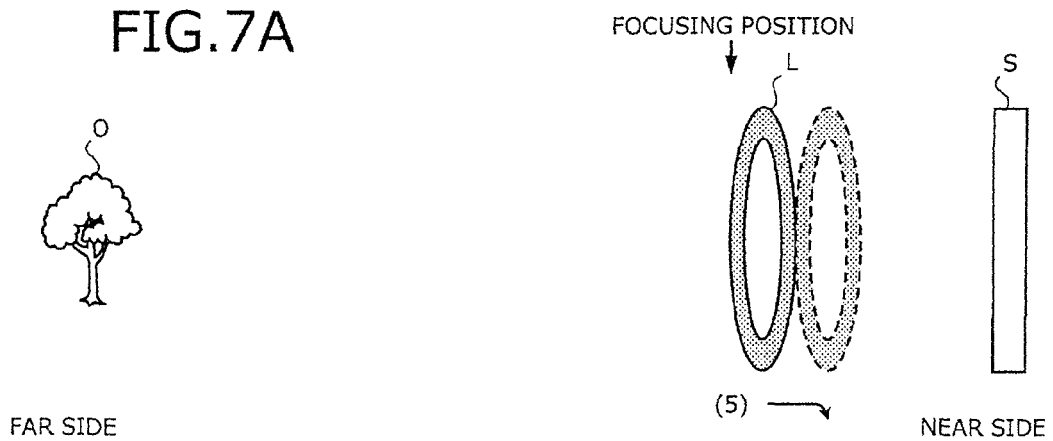
Figure 7B:
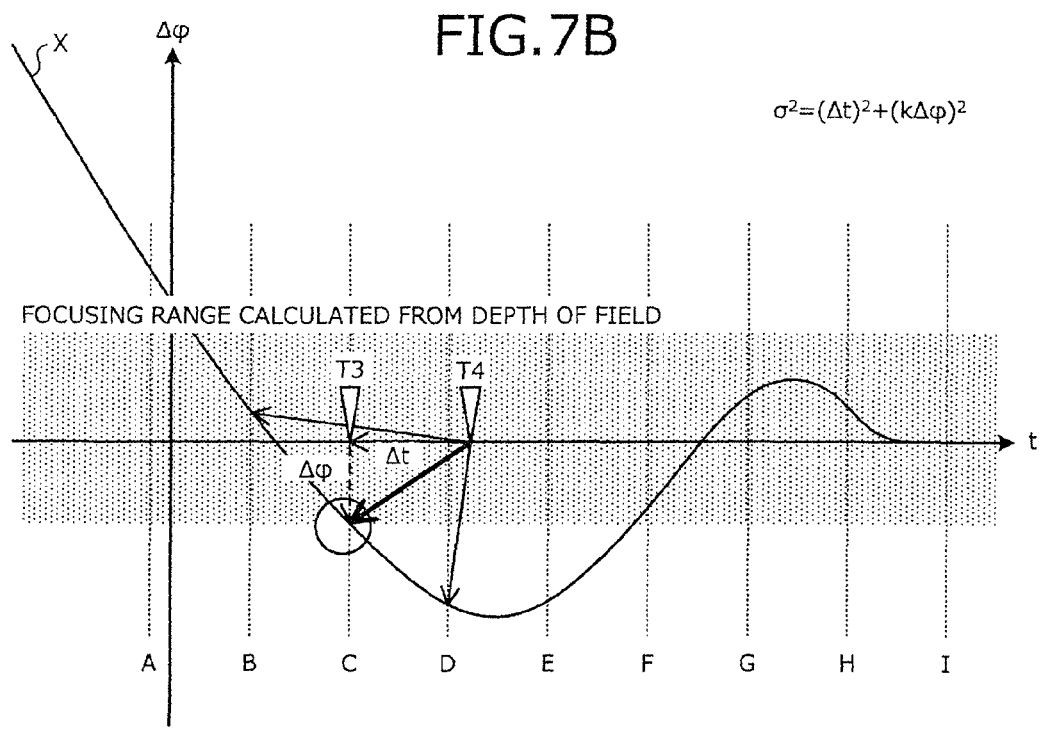

FIGS. 7A and 7B depict an example concerning time point 4 at which an imaging instruction is received after the lens L has passed the focusing position during AF when the imaging apparatus 100 moves the lens L. In the example depicted in FIG. 7A, (5) to move the lens L in the opposite direction, the imaging apparatus 100 has to first stop moving the lens L toward the near side, and then the imaging apparatus 100 proceeds to move the lens L at a slower speed.

While the imaging apparatus 100 is moving the lens L at the slower speed, the imaging apparatus 100 receives the imaging instruction at time point T4. Here, the lens L has passed the focusing position and an imaging instruction has been received; therefore, the imaging apparatus 100 suspends AF although AF has not been completed. As a result, the imaging apparatus 100 can reduce the power consumed for AF.

FIG. 7B depicts imaging operations during AF. In the graph depicted in FIG. 7B, the solid line X, the vertical axis, the horizontal axis, and the dotted lines are the same as those in the graph in depicted FIG. 6B and therefore, description thereof is omitted.

At time point T4, the imaging apparatus 100 calculates evaluation values from images B to D respectively captured at imaging time points from an imaging time point immediately before time point T3 when the lens L passes the focusing position, until an imaging time point immediately before time point T4 when the imaging instruction is received, and the imaging apparatus 100 calculates the difference Δφ of the focus value and the evaluation values.

Next, the imaging apparatus 100 calculates the difference Δt of time point T4 when the imaging instruction is received and the imaging time points of images B to D. The imaging apparatus 100 calculates the total evaluation value σ for images B to D and, selects and outputs image C, for which the total evaluation value is the smallest.

Thus, the imaging apparatus 100 can select and output image C, which is a focused image captured at a time point closer to the time point at which the user wanted to capture an image than the time point of image I. Further, the imaging apparatus 100 can select and output image C, which is captured with the lens L in a better focal range than image D, at a time point close to the time point at which the user wanted to capture an image.

Although, here, the imaging apparatus 100 has been described to select the image when an imaging instruction is received after the lens L has passed the focusing position, configuration is not limited hereto. For example, when an imaging instruction is received after the lens L has passed the focusing position, the imaging apparatus 100, without suspending AF, may select an image after waiting until the lens L again passes the focusing position. Description will be given with reference to FIGS. 8A and 8B.

Figure 8A:
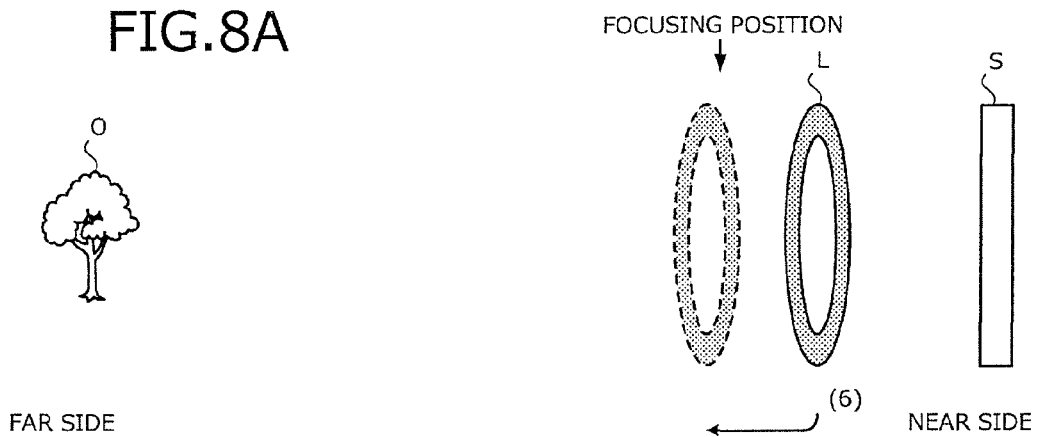
Figure 8B:
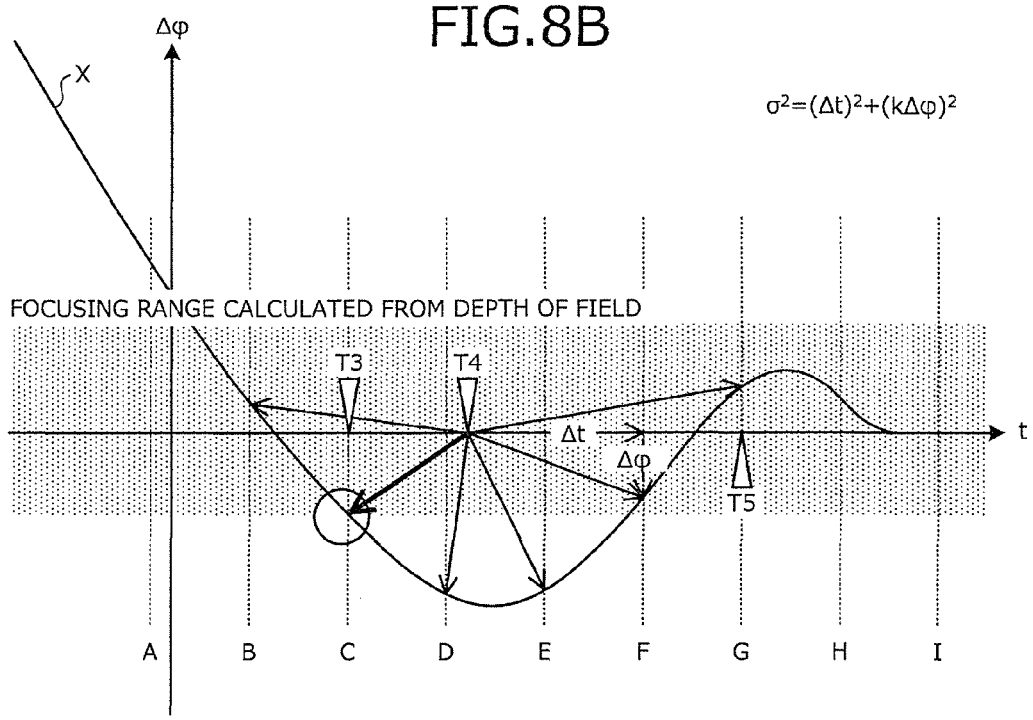

FIGS. 8A and 8B depict an example concerning time point T5 at which the lens L again passes the focusing position when the imaging apparatus 100, without suspending AF, receives an imaging instruction after the lens L last passed the focusing position. In the example depicted in FIG. 8A, (6) the imaging apparatus 100 continues to move the lens L in the opposite direction.

While the imaging apparatus 100 continues to move the lens L toward the far side, at time point T5, the evaluation value begins to decrease, not increase and therefore, the imaging apparatus 100 judges that the lens L has again passed the focusing position. Here, after the imaging apparatus 100 receives the imaging instruction, the lens L again passes the focusing position and therefore, although AF has not been completed, the imaging apparatus 100 suspends AF. As a result, the imaging apparatus 100 can reduce the power consumed for AF.

FIG. 8B depicts imaging operations during AF. In the graph depicted in FIG. 8B, the solid line X, the vertical axis, the horizontal axis, and the dotted lines are the same as those depicted in the graph in FIG. 6B and therefore, description thereof will be omitted.

At time point T5, the imaging apparatus 100 calculates evaluation values from images B to G respectively captured at imaging time points from an imaging time point immediately before time point T3 when the lens L passes the focusing position, until an imaging time point at time point T5 when the lens L again passes the focusing position and the imaging apparatus 100 calculates the difference Δφ of the focus value and the evaluation values.

Next, imaging apparatus 100 calculates the difference Δt of time point T4 when the imaging instruction was received and the imaging time points of images B to G. The imaging apparatus 100 calculates the total evaluation value σ for images B to G and, selects and outputs image C, for which the total evaluation value is the smallest.

Thus, the imaging apparatus 100 can select and output image C, which is a focused image captured at a time point closer to the time point at which the user wanted to capture an image than the time point of image I. Further, the imaging apparatus 100 can select and output image C, which is captured with the lens L in a better focal range than image D, at a time point close to the time point at which the user wanted to capture an image.

Although, here, the imaging apparatus 100 has been described to select 1 image, configuration is not limited hereto. For example, the imaging apparatus 100 may select plural images for which the total evaluation value σ is less than or equal to a threshold. As a result, the user can select an image desired to be recorded, from among images that are in focus and captured at time points close to the time point that the user wanted to capture an image.

A second example of the imaging process performed by the imaging apparatus 100 will be described with reference to FIGS. 9A to 11B.

Figure 9A:
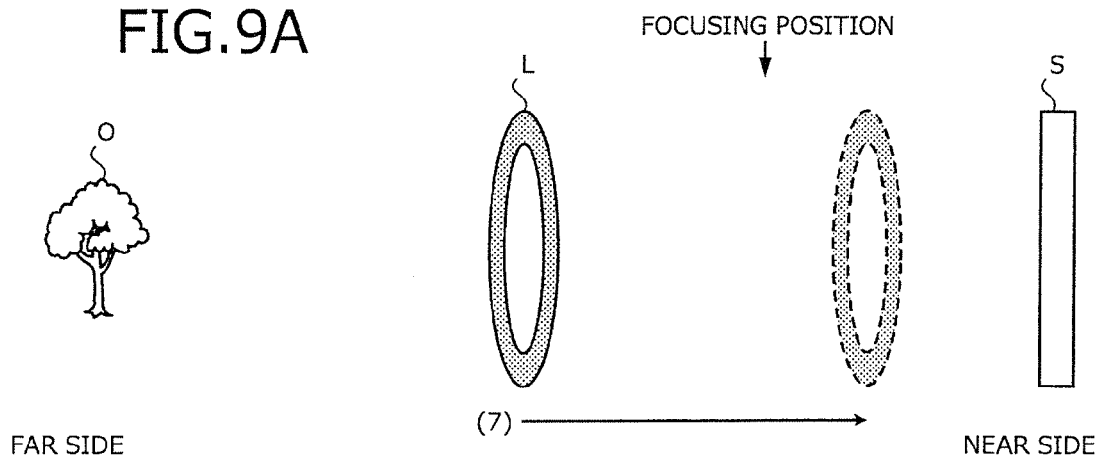
FIGS. 9A, 9B, 10A, 10B, 11A, and 11B are diagrams of a second example of the imaging process performed by the imaging apparatus 100.
Figure 9B:
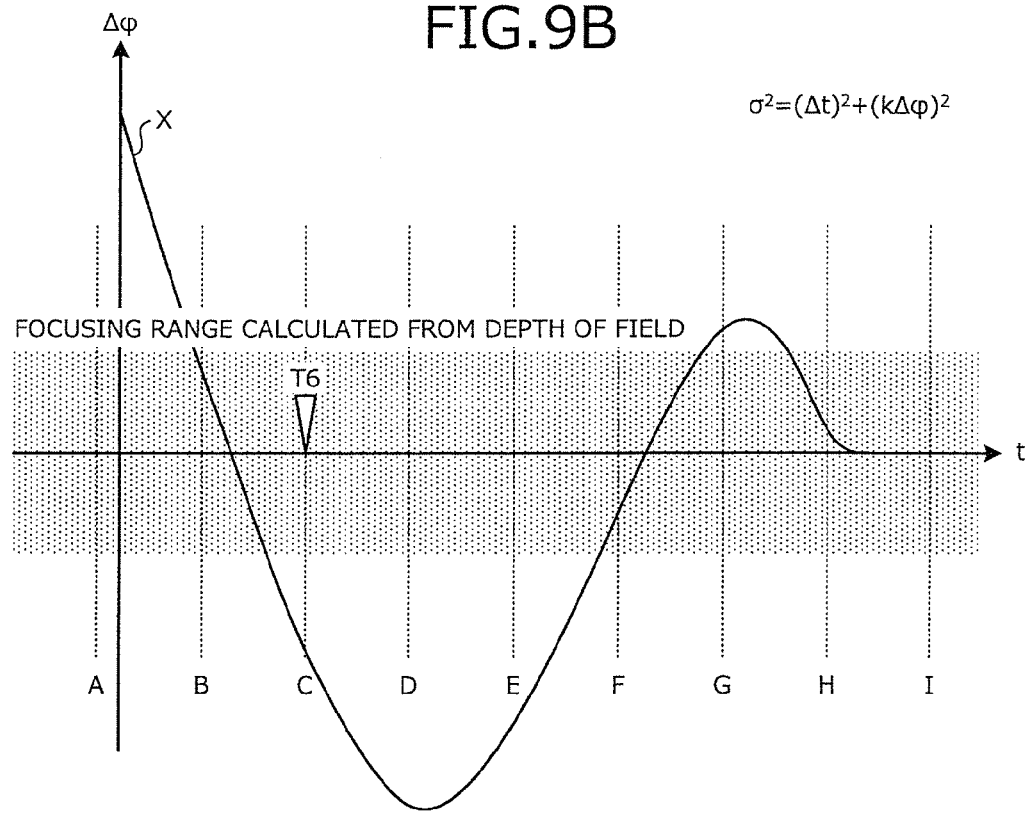

FIGS. 9A, 9B, 10A, 10B, 11A, and 11B are diagrams of the second example of the imaging process performed by the imaging apparatus 100. FIGS. 9A and 9B depict an example concerning time point T6, the time point at which the lens L first passes the focusing position during AF when the imaging apparatus 100 moves the lens L. In the example depicted in FIG. 9A, (7) the imaging apparatus 100 moves the lens L toward the near side whereby the evaluation value increases and therefore, the imaging apparatus 100 judges that the lens is approaching the focusing position and continues to move the lens L toward the near side.

While the imaging apparatus 100 continues to move the lens L toward the near side, at time point T6, the evaluation value begins to decrease, not increase and therefore, the imaging apparatus 100 judges that the lens L has passed the focusing position. Here, the imaging apparatus 100 has not yet received an imaging instruction and therefore continues AF.

FIG. 9B depicts imaging operations during AF. In the graph depicted in FIG. 9B, the solid line X, the vertical axis, the horizontal axis, and the dotted lines are the same as those in the graph depicted in FIG. 6B and therefore, description thereof is omitted.

At time point T6, upon judging that the lens has passed the focusing position, the imaging apparatus 100 calculates the focus value. The imaging apparatus 100, for example, calculates an evaluation value from image B captured by the image sensor S immediately before the lens L passes the focusing position, calculates an evaluation value from image C captured by the image sensor S immediately after the lens L has passed the focusing position, and calculates the average of the evaluation values as the focus value. Next, description will be given with reference to FIGS. 10A and 10B.

Figure 10A:
Figure 10B:
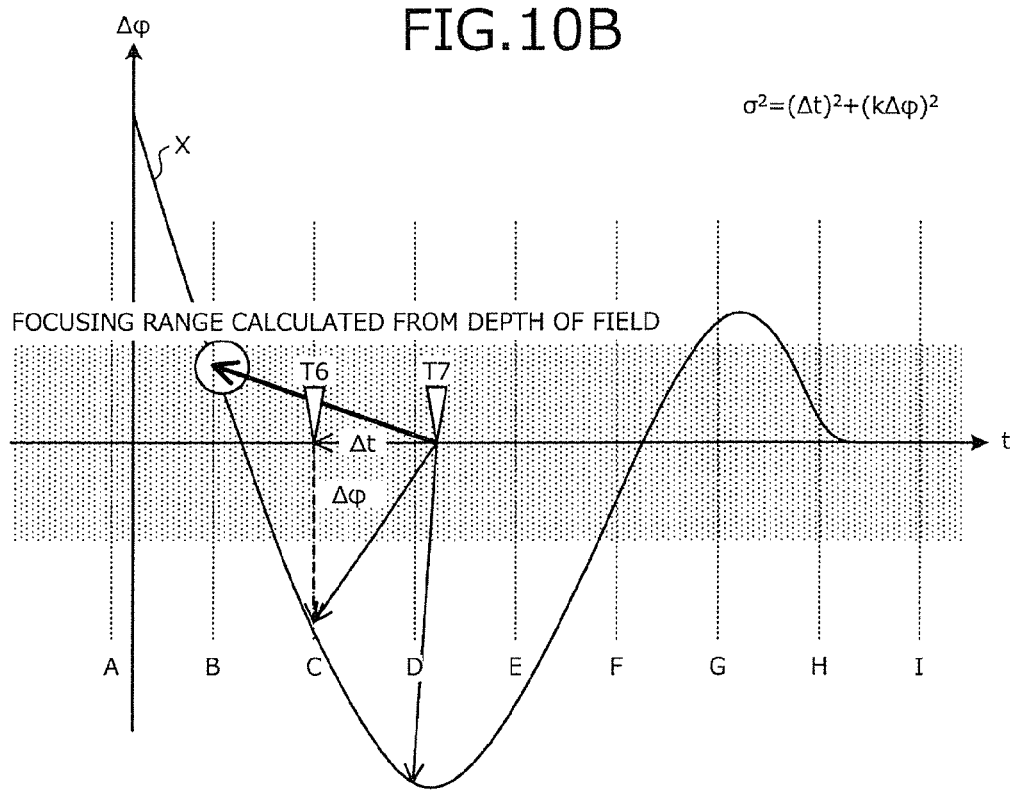

FIGS. 10A and 10B depict an example concerning time point T7 at which an imaging instruction is received after the lens L has passed the focusing position during AF when the imaging apparatus 100 moves the lens L. In the example depicted in FIG. 10A, (8) to move the lens L in the opposite direction, the imaging apparatus 100 has to first stop moving the lens L toward the near side, and then the imaging apparatus 100 proceeds to move the lens L at a slower speed.

While the imaging apparatus 100 is moving the lens L at the slower speed, the imaging apparatus 100 receives an imaging instruction at time point T7. Here, the lens L has passed the focusing position and an imaging instruction has been received; therefore, the imaging apparatus 100 suspends AF although AF has not been completed. As a result, the imaging apparatus 100 can reduce the power consumed for AF.

FIG. 10B depicts imaging operations during AF. In the graph depicted in FIG. 10B, the solid line X, the vertical axis, the horizontal axis, and the dotted lines are the same as those in the graph depicted in FIG. 6B and therefore, description thereof is omitted.

At time point T7, the imaging apparatus 100 calculates evaluation values from images B to D respectively captured at imaging time points from an imaging time point immediately before time point T6 when the lens L passes the focusing position, until an imaging time point immediately before time point T7 when the imaging instruction is received, and the imaging apparatus 100 calculates the difference Δφ of the focus value and the evaluation values.

Next, the imaging apparatus 100 calculates the difference Δt of time point T7 when the imaging instruction is received and the imaging time points of images B to D. The imaging apparatus 100 calculates the total evaluation value σ for images B to D and, selects and outputs image B, for which the total evaluation value is the smallest.

Thus, the imaging apparatus 100 can select and output image B, which is a focused image captured at a time point closer to the time point at which the user wanted to capture an image than the time point of image I. Further, the imaging apparatus 100 can select and output image B, which is captured with the lens L in a better focal range than image D, at a time point close to the time point at which the user wanted to capture an image.

Although, here, the imaging apparatus 100 has been described to select an image when an imaging instruction has been received after the lens L has passed the focusing position, configuration is not limited hereto. For example, when an imaging instruction is received after the lens L has passed the focusing position, the imaging apparatus 100, without suspending AF, may select an image after waiting until the lens L again passes the focusing position. Description will be given with reference to FIGS. 11A and 11B.

Figure 11A:
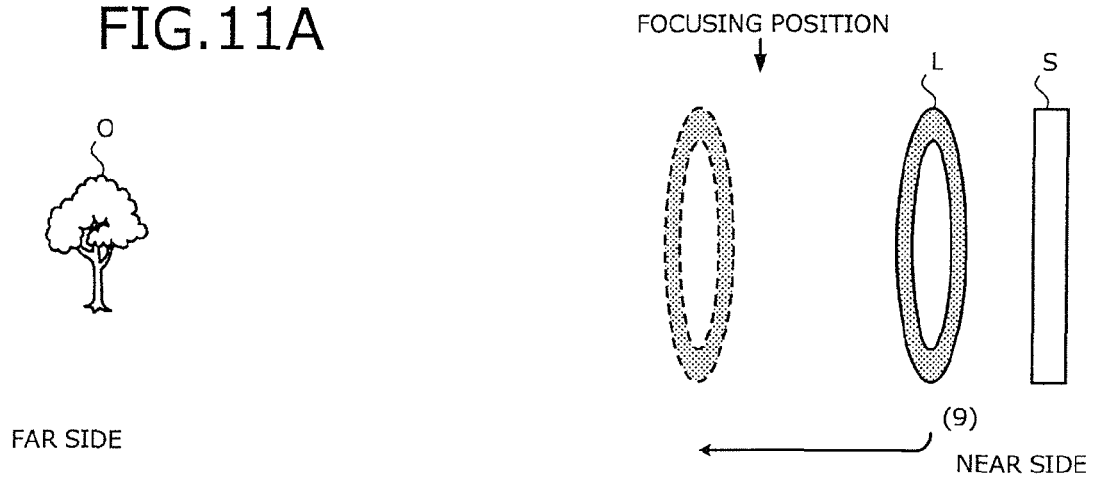
Figure 11B:
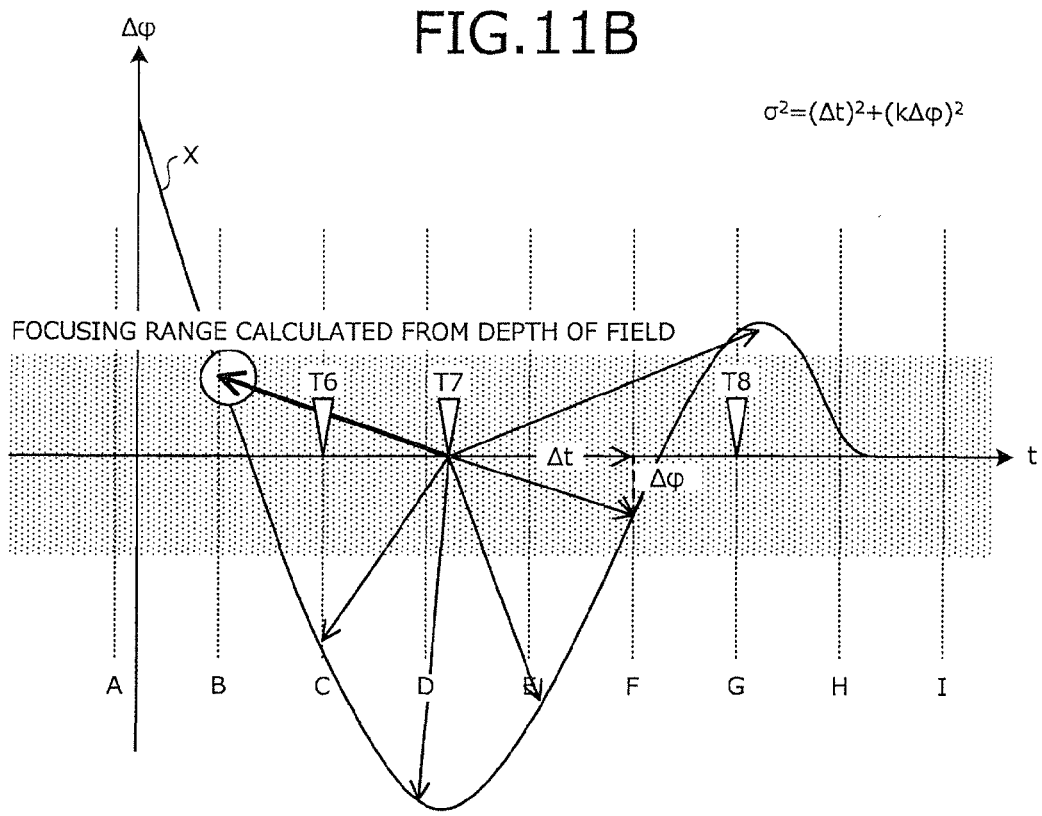

FIGS. 11A and 11B depict an example concerning time point T8 at which the lens L again passes the focusing position when the imaging apparatus 100, without suspending AF, receives an imaging instruction after the lens L last passed the focusing position. In the example depicted in FIG. 11A, (9) the imaging apparatus 100 continues to move the lens L in the opposite direction.

While the imaging apparatus 100 continues to move the lens L toward the far side, at time point T8, the evaluation value begins to decrease, not increase and therefore, the imaging apparatus 100 judges that the lens L has again passed the focusing position. Here, after the imaging apparatus 100 receives the imaging instruction, the lens L again passes the focusing position and therefore, although AF has not been completed, the imaging apparatus 100 suspends AF. As a result, the imaging apparatus 100 can reduce the power consumed for AF.

FIG. 11B depicts imaging operations during AF. In the graph depicted in FIG. 11B, the solid line X, the vertical axis, the horizontal axis, and the dotted lines are the same as those depicted in the graph in FIG. 6B and therefore, description thereof will be omitted.

At time point T8, the imaging apparatus 100 calculates evaluation values from images B to G respectively captured at imaging time points from an imaging time point immediately before time point T6 when the lens L passes the focusing position, until an imaging time point at time point T8 when the lens L again passes the focusing position focus and the imaging apparatus 100 calculates the difference Δφ of the focus value and the evaluation values.

Next, imaging apparatus 100 calculates the difference Δt of time point T7 when the imaging instruction was received and the imaging time points of images B to G. The imaging apparatus 100 calculates the total evaluation value σ for images B to G and, selects and outputs image B, for which the total evaluation value is the smallest.

Thus, the imaging apparatus 100 can select and output image B, which is a focused image captured at a time point closer to the time point at which the user wanted to capture an image than the time point of image I. Further, the imaging apparatus 100 can select and output image B, which is captured with the lens L in a better focal range than image D, at a time point close to the time point at which the user wanted to capture an image.

Although, here, the imaging apparatus 100 has been described to select 1 image, configuration is not limited hereto. For example, the imaging apparatus 100 may select plural images for which the total evaluation value σ is less than or equal to a threshold. As a result, the user can select an image desired to be recorded, from among images that are in focus and captured at time points close to the time point that the user wanted to capture an image.

A third example of the imaging process performed by the imaging apparatus 100 will be described with reference to FIGS. 12A to 13B.

Figure 12A:
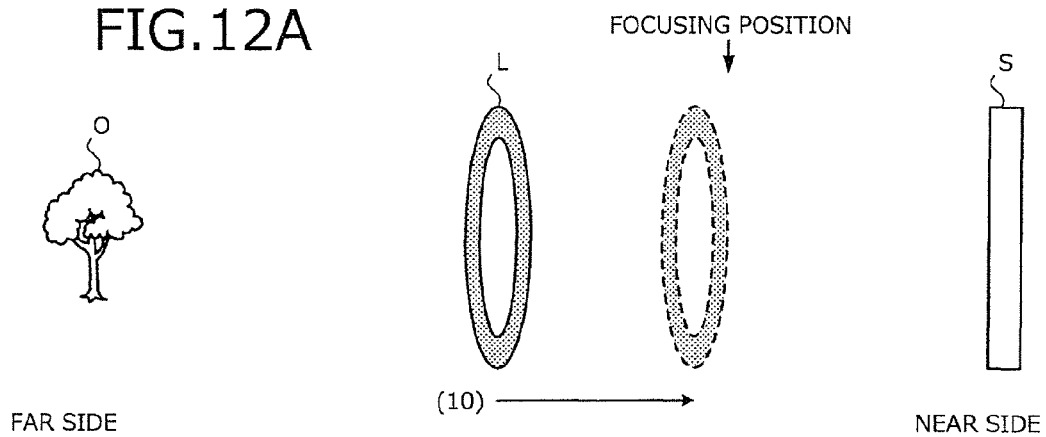
FIGS. 12A, 12B, 13A and 13B are diagrams of a third example of the imaging process performed by the imaging apparatus 100.
Figure 12B:
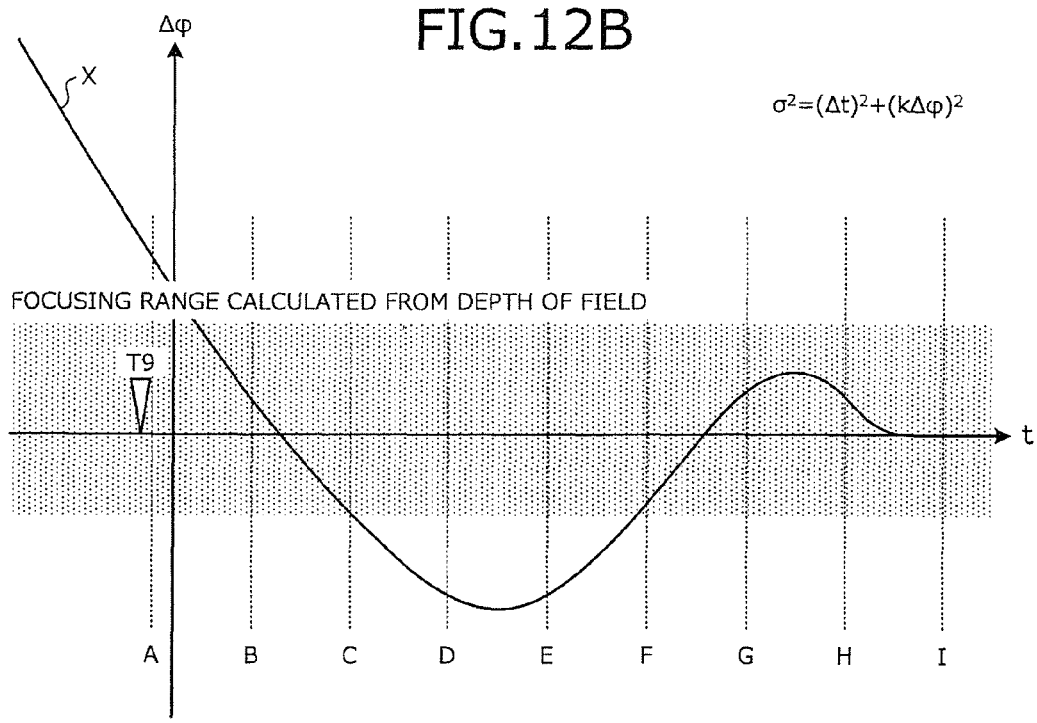

FIGS. 12A, 12B, 13A and 13B are diagrams of the third example of the imaging process performed by the imaging apparatus 100. FIGS. 12A and 12B depict an example concerning time point T9 at which an imaging instruction is received before the lens L passes the focusing position during AF when the imaging apparatus 100 moves the lens L. In the example depicted in FIG. 9A, (10) the evaluation value has increased consequent to the imaging apparatus 100 moving the lens L toward the near side and therefore, the imaging apparatus 100 judges that the lens L is approaching the focusing position and continues to move the lens L toward the near side. At time point T9, the imaging apparatus 100 receives an imaging instruction. Here, the lens L has not yet passed the focusing position and therefore, the imaging apparatus 100 continues AF.

FIG. 12B depicts imaging operations during AF. In the graph depicted in FIG. 12B, the solid line X, the vertical axis, the horizontal axis, and the dotted lines are the same as those depicted in the graph in FIG. 6B and therefore, description thereof will be omitted. Next, description will be given with reference to FIGS. 13A and 13B.

Figure 13A:
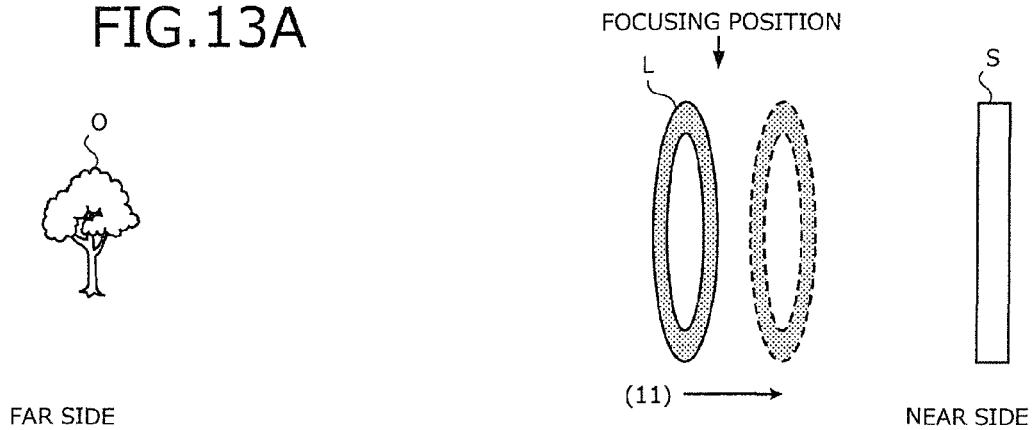
Figure 13B:
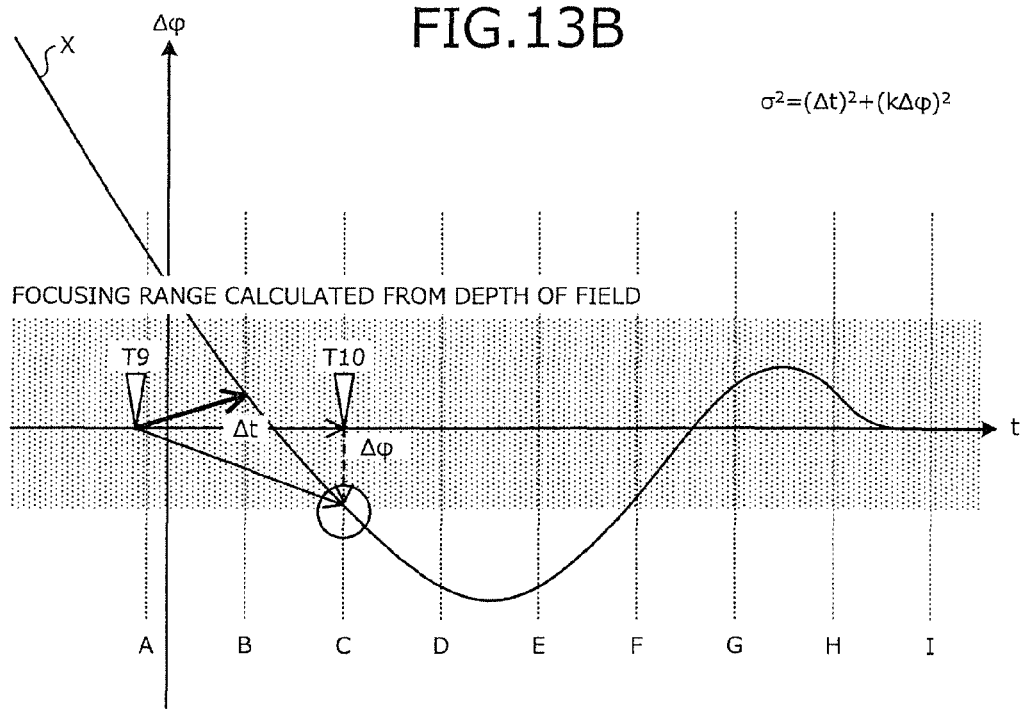

FIGS. 13A and 13B depict an example concerning time point T10 at which the lens L passes the focusing position during AF when the imaging apparatus 100 moves the lens L and after an imaging instruction has been received. In the example depicted in FIG. 13A, (11) the evaluation value has increased consequent to the imaging apparatus 100 moving the lens L toward the near side and therefore, the imaging apparatus 100 judges that the lens L is approaching the focusing position and continues to move the lens L toward the near side.

While the imaging apparatus 100 continues to move the lens L toward the near side, at time point T10, the evaluation value begins to decrease, not increase and therefore, the imaging apparatus 100 judges that the lens L has passed the focusing position. Here, the imaging apparatus 100 has received an imaging instruction and the lens L has passed the focusing position; therefore, the imaging apparatus 100 suspends AF.

FIG. 13B depicts imaging operations during AF. In the graph depicted in FIG. 13B, the solid line X, the vertical axis, the horizontal axis, and the dotted lines are the same as those depicted in the graph in FIG. 6B and therefore, description thereof will be omitted.

At time point T10, upon judging that the lens L has passed the focusing position, the imaging apparatus 100 calculates the focus value. The imaging apparatus 100, for example, calculates an evaluation value from image B captured by the image sensor S immediately before the lens L passes the focusing position, calculates an evaluation value from image C captured by the image sensor S immediately after the lens L has passed the focusing position, and calculates the average of the evaluation values as the focus value.

The imaging apparatus 100 calculates evaluation values from images A to C respectively captured at imaging time points from an imaging time point immediately before the imaging instruction is received, until an imaging time point immediately after time point T10 when the lens L passes the focusing position and the imaging apparatus 100 calculates the difference Δϕ of focus value and the evaluation values.

Next, imaging apparatus 100 calculates the difference Δt of time point T9 when the imaging instruction was received and the imaging time points of images A to C. The imaging apparatus 100 calculates the total evaluation value σ for images A to C and, selects and outputs image B, for which the total evaluation value σ is the smallest.

Thus, the imaging apparatus 100 can select and output image B, which is a focused image captured at a time point closer to the time point at which the user wanted to capture an image than the time point of image I. Further, the imaging apparatus 100 can select and output image B, which is captured with the lens L in a better focal range than image D, at a time point close to the time point at which the user wanted to capture an image.

Although, here, the imaging apparatus 100 has been described to select 1 image, configuration is not limited hereto. For example, the imaging apparatus 100 may select plural images for which the total evaluation value σ is less than or equal to a threshold. As a result, the user can select an image desired to be recorded, from among images that are in focus and captured at time points close to the time point that the user wanted to capture an image.

An example of a procedure of an imaging preparation process performed by the imaging apparatus 100 will be described with reference to FIGS. 14 and 15.

Figure 14:
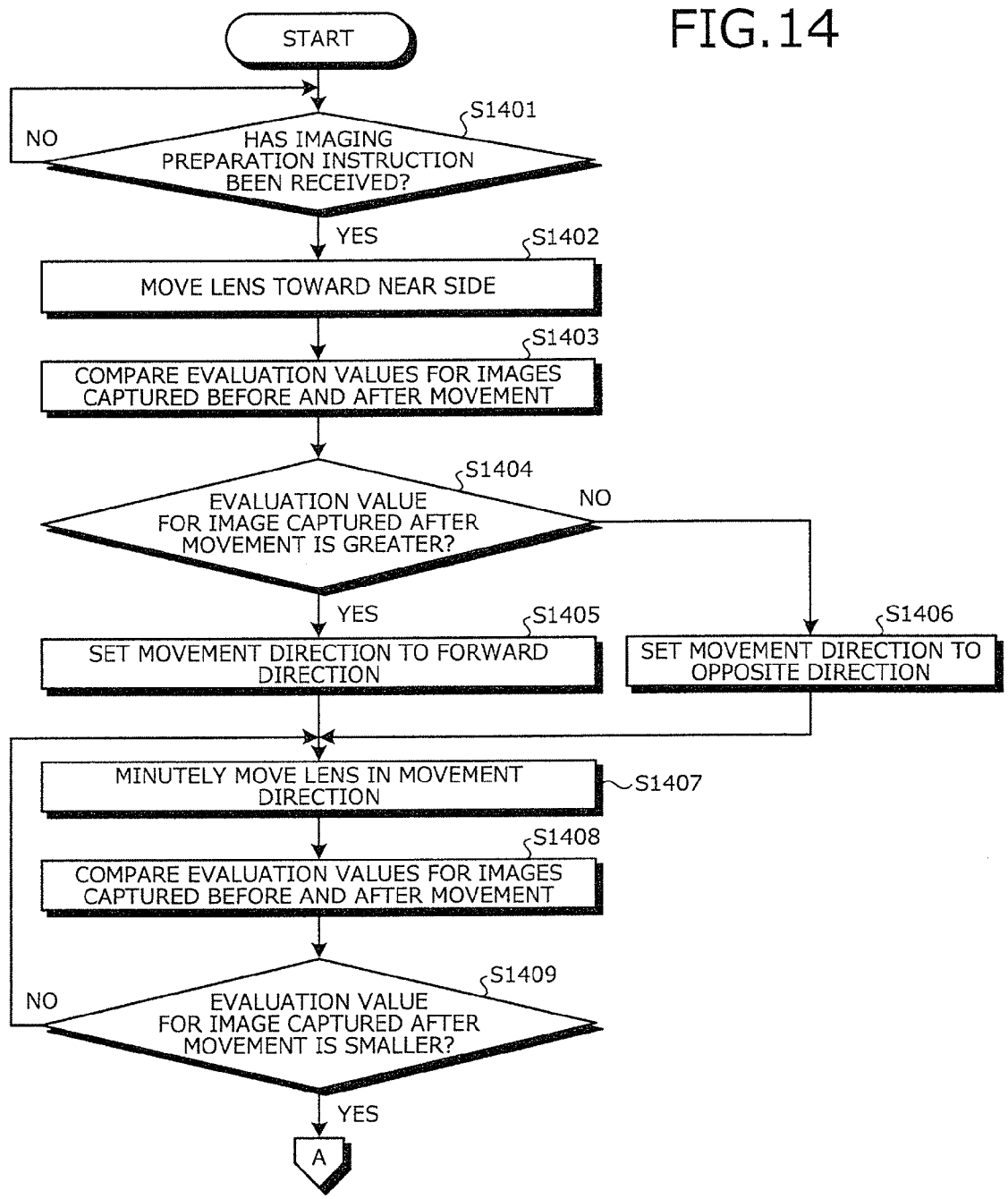

FIGS. 14 and 15 are flowcharts of an example of a procedure of an imaging preparation process performed by the imaging apparatus 100. As depicted in FIG. 14, the imaging apparatus 100 judges whether an imaging preparation instruction has been received (step S1401). If not (step S1401: NO), the imaging apparatus 100 returns to the operation at step S1401.

On the other hand, if an imaging preparation instruction has been received (step S1401: YES), the imaging apparatus 100 moves the lens L toward the near side (step S1402). At step S1402, the imaging apparatus 100 may move the lens L toward the far side. The imaging apparatus 100 compares the evaluation values for images captured before and after movement of the lens L (step S1403).

The imaging apparatus 100 judges whether the evaluation value for the image captured after the movement is greater (step S1404). If so (step S1404: YES), the imaging apparatus 100 sets the movement direction to a forward direction (step S1405). The forward direction is toward the near side when the lens L is moved toward the near side at step S1402, and is toward the far side when the lens L is moved toward the far side at step S1402. The imaging apparatus 100 transitions to the operation at step S1407.

On the other hand, if the evaluation value for the image captured after the movement is not greater (step S1404: NO), the imaging apparatus 100 sets the movement direction to an opposite direction (step S1406). The opposite direction is toward the far side when the lens L is moved toward the near side at step S1402, and is toward the near side when the lens L is moved toward the far side at step S1402. The imaging apparatus 100 transitions to the operation at step S1407.

At step S1407, the imaging apparatus 100 minutely moves the lens L in the movement direction (step S1407). The imaging apparatus 100 compares the evaluation values for images captured before and after movement of the lens L (step S1408).

The imaging apparatus 100 judges whether the evaluation value for the image captured after the movement is smaller (step S1409). If not (step S1409: NO), the imaging apparatus 100 returns to the operation at step S1407. On the other hand, if the evaluation value for the image after the movement is smaller (step S1409: YES), the imaging apparatus 100 transitions to the operation at step S1501 in FIG. 15.

As depicted in FIG. 15, the imaging apparatus 100 judges that the lens L has passed the focusing position, and sets the movement direction to the opposite direction (step S1501); and minutely moves the lens L in the movement direction, by an amount less than that at step S1407 (step S1502). The imaging apparatus 100 compares the evaluation values for images captured before and after movement of the lens L (step S1503).

The imaging apparatus 100 judges whether the evaluation value for the image captured after the movement is smaller (step S1504). If not (step S1504: NO), the imaging apparatus 100 returns to the operation at step S1502.

On the other hand, if the evaluation value for the image captured after the movement is smaller (step S1504: YES), the imaging apparatus 100 judges that the lens L has passed the focusing position, and sets the movement direction to the opposite direction (step S1505); and minutely moves the lens L in the movement direction, by an amount less than that at step S1502 (step S1506).

The imaging apparatus 100 fixes the position of the lens L (step S1507). The imaging apparatus 100 judges whether an imaging instruction has been received (step S1508). If no imaging instruction has been received (step S1508: NO), the imaging apparatus 100 returns to the operation at step S1508.

On the other hand, if an imaging instruction has been received (step S1508: YES), the imaging apparatus 100 outputs an image captured at a time point close to the time point at which the imaging instruction was received (step S1509). The imaging apparatus 100 ends the imaging preparation process. Thus, the imaging apparatus 100 can output an image, when an imaging instruction is received after performing AF and focusing the lens L.

An example of a procedure of an image selection process performed by the imaging apparatus 100 will be described with reference to FIG. 16.

FIG. 16 is a flowchart of an example of a procedure of an image selection process performed by the imaging apparatus 100. As depicted in FIG. 16, the imaging apparatus 100 begins the imaging preparation process (step S1601). Next, the imaging apparatus 100 judges whether an imaging instruction has been received (step S1602).

If no imaging instruction has been received (step S1602: NO), the imaging apparatus 100 judges whether the lens L has passed the focusing position, by the imaging preparation process (step S1603). If the lens L has not passed the focusing position (step S1603: NO), the imaging apparatus 100 returns to the operation at step S1602.

On the other hand, if the lens L has passed the focusing position (step S1603: YES), the imaging apparatus 100 judges whether an imaging instruction has been received (step S1604). If no imaging instruction has been received (step S1604: NO), the imaging apparatus 100 returns to the operation at step S1604. On the other hand, if an imaging instruction has been received (step S1604: YES), the imaging apparatus 100 transitions to the operation at step S1606.

At step S1602, if an imaging instruction has been received (step S1602: YES), the imaging apparatus 100 judges whether the lens L has passed the focusing position, by the imaging preparation process (step S1605). If the lens L has not passed the focusing position (step S1605: NO), the imaging apparatus 100 returns to the operation at step S1605. On the other hand, if the lens L has passed the focusing position (step S1605: YES), the imaging apparatus 100 transitions to the operation at step S1606.

At step S1606, the imaging apparatus 100 calculates the focus value (step S1606); and based on the focus value, the imaging apparatus 100 calculates the total evaluation value for the images (step S1607). Based on total evaluation value, the imaging apparatus 100 selects and outputs an image (step S1608).

The imaging apparatus 100 suspends the imaging preparation process even if the imaging preparation process has not been completed (step S1609). The imaging apparatus 100 ends the image selection process. Thus, the imaging apparatus 100 can select an image even before AF has been completed and can suspend AF prior to completion thereof. Consequently, the imaging apparatus 100 can reduce the power consumed for AF.

As described, the imaging apparatus 100 detects whether the lens L has passed the focusing position, based on temporal changes of the evaluation values for images during AF, and calculates the focus value. Next, based on the difference of the focus value and the evaluation values of images, the imaging apparatus 100 selects an image stored in the buffer memory 230. Thus, the imaging apparatus 100 is able to select and output a focused image even if AF has not yet been completed.

Further, the imaging apparatus 100 can select an image in the buffer memory 230, based on the difference of the focus value and the evaluation values of images, and the difference of the time point when the imaging instruction was received and the time points when the images were captured. Thus, without waiting for completion of AF, the imaging apparatus 100 can select and output an image that is focused and captured at a time point that is close to the time point at which the user wanted to capture an image. Further, even if the image captured at the time point closest to the time point at which the user wanted to capture an image is not focused, the imaging apparatus 100 can select and output an image captured with the lens L in the focal range, at a time point close to the time point at which the user wanted to capture an image. As a result, the imaging apparatus 100 can output an image in line with the photographic intent of the user.

Here, when an imaging instruction is received before AF is completed, a conventional imaging apparatus may output the image captured at the time point closest to the time point at which an imaging instruction is received. Nonetheless, in this case, since AF has not yet been completed, the image output may be an image that is not focused. On the other hand, the imaging apparatus 100 can select an image in the buffer memory 230, based on the difference of the focus value and the evaluation values of images, and the difference of the time point when the imaging instruction was received and the time points when the images were captured. Thus, the imaging apparatus 100 can select and output an image that is captured with the lens L in the focal range, at a time point that is close to the time point at which the user wanted to capture an image.

The imaging apparatus 100 can suspend the photographing of the object O, when an image has been selected. As a result, the imaging apparatus 100 can reduce the power consumed for AF. Further, the imaging apparatus 100 can suspend the photographing of the object O, when the lens L first passes the focusing position after an imaging instruction has been received. As a result, the imaging apparatus 100 can reduce the power consumed for AF.

The imaging apparatus 100 can suspend the photographing of the object O, when an imaging instruction has been received after the lens L has passed the focusing position. As a result, the imaging apparatus 100 can reduce the power consumed for AF. Further, the imaging apparatus 100 starts AF, if an imaging preparation instruction has been received. As a result, the imaging apparatus 100 can reduce the power consumed for AF.

The imaging method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

One aspect of the embodiment enables output of a more focused image even if AF has not been completed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An imaging apparatus comprising:
    an image sensor configured to capture an image of an object through a lens;
    a memory configured to store images captured by the image sensor; and
    a processor configured to perform a process including:
    adjusting a position of the lens, based on a value that is obtained from each of the images captured by the image sensor and that represents an extent of focusing by the lens;
    calculating a local maximum value of the value that represents the extent of focusing by the lens, based on temporal changes of the value that is obtained from each of the images successively captured by the image sensor and that represents the extent of focusing by the lens; and
    selecting an image from among the images stored in the memory, based on differences of the local maximum value calculated by the calculating and the value obtained from each of the images and representing the extent of focusing by the lens.

2. The imaging apparatus according to claim 1, wherein the processor is further configured to perform a process including:
    receiving input an imaging instruction; and selecting an image from among the images stored in the memory unit, based on the imaging instruction and the differences of the local maximum value calculated by the calculating and the value obtained from each of the images and representing the extent of focusing by the lens.

3. The imaging apparatus according to claim 2, wherein the image sensor suspends photographing of the object, when an image has been selected by the processor.

4. The imaging apparatus according to claim 2, wherein the image sensor suspends photographing of the object, when the value representing the extent of focusing by the lens has been detected to be first locally maximized after the imaging instruction has been received.

5. The imaging apparatus according to claim 2, wherein the image sensor suspends photographing of the object, when the imaging instruction has been received after the value representing the extent of focusing by the lens has been detected to be locally maximized.

6. The imaging apparatus according to claim 2, wherein the processor is further configured to perform a process including receiving an imaging preparation instruction before the imaging instruction, and the image sensor starts photographing the object, when the imaging preparation instruction has been received by the processor.

7. An imaging method comprising:

adjusting, by a processor, a position of a lens, based on a value that is obtained from an image captured of an object through the lens and that represents an extent of focusing by the lens;

calculating, by the processor, a local maximum value of the value that represents the extent of focusing by the lens, based on temporal changes of the value that is obtained from each image successively captured of the object; and selecting, by the processor, an image from among images stored by a memory configured to store the images successively captured, the image being selected based on differences of the calculated local maximum value and the value obtained from each captured image and representing the extent of focusing by the lens.

* * * * *